(12) United States Patent
Ori

(10) Patent No.: US 7,558,004 B2
(45) Date of Patent: Jul. 7, 2009

(54) VARIABLE POWER OPTICAL SYSTEM

(75) Inventor: Tetsuya Ori, Saitama (JP)

(73) Assignee: Fujinon Corporation, Saitama (JP)

( * ) Notice: Subject to any disclaimer, the term of this patent is extended or adjusted under 35 U.S.C. 154(b) by 99 days.

(21) Appl. No.: 11/783,072

(22) Filed: Apr. 5, 2007

(65) Prior Publication Data

US 2007/0236806 A1 Oct. 11, 2007

(30) Foreign Application Priority Data

Apr. 6, 2006 (JP) ............................ P2006-105111

(51) Int. Cl.
*G02B 15/14* (2006.01)
(52) U.S. Cl. ...................................... 359/686; 359/676
(58) Field of Classification Search ................. 359/676, 359/678, 686
See application file for complete search history.

(56) References Cited

U.S. PATENT DOCUMENTS

| | | | |
|---|---|---|---|
| 7,110,186 B2 | 9/2006 | Sueyoshi | |
| 2006/0056044 A1 * | 3/2006 | Iwasawa | ..................... 359/676 |

2006/0066951 A1  3/2006  Sensui

FOREIGN PATENT DOCUMENTS

| | | | |
|---|---|---|---|
| CN | 1591073 A | | 5/2004 |
| EP | 1 632 802 A2 | | 3/2006 |
| JP | 2535969 B2 | | 7/1996 |
| JP | 2560377 B2 | | 9/1996 |
| JP | 2605326 B2 | | 2/1997 |
| JP | 2001-272601 A | | 10/2001 |
| JP | 2006-23593 A | | 1/2006 |

* cited by examiner

*Primary Examiner*—Darryl J Collins
(74) *Attorney, Agent, or Firm*—Birch, Stewart, Kolasch & Birch, LLP

(57) ABSTRACT

A variable power optical system is provided and includes a positive first lens group, a negative second lens group, a positive fifth lens group, a positive third lens group, and a negative fourth lens group containing first to third sub lens groups, in order from the side of an object. The second lens group is moved, thereby performing variable power and the third lens group is moved, thereby correcting image surface variation caused by the variable power and performing focusing. The fourth lens group is fixed at the variable power time and the focusing time. To correct image blurring, only the second sub lens group is moved in a direction perpendicular to an optical axis. Accordingly, a sufficiently good image blurring correction function can be exerted and a simple and compact configuration as a whole can be implemented.

25 Claims, 37 Drawing Sheets

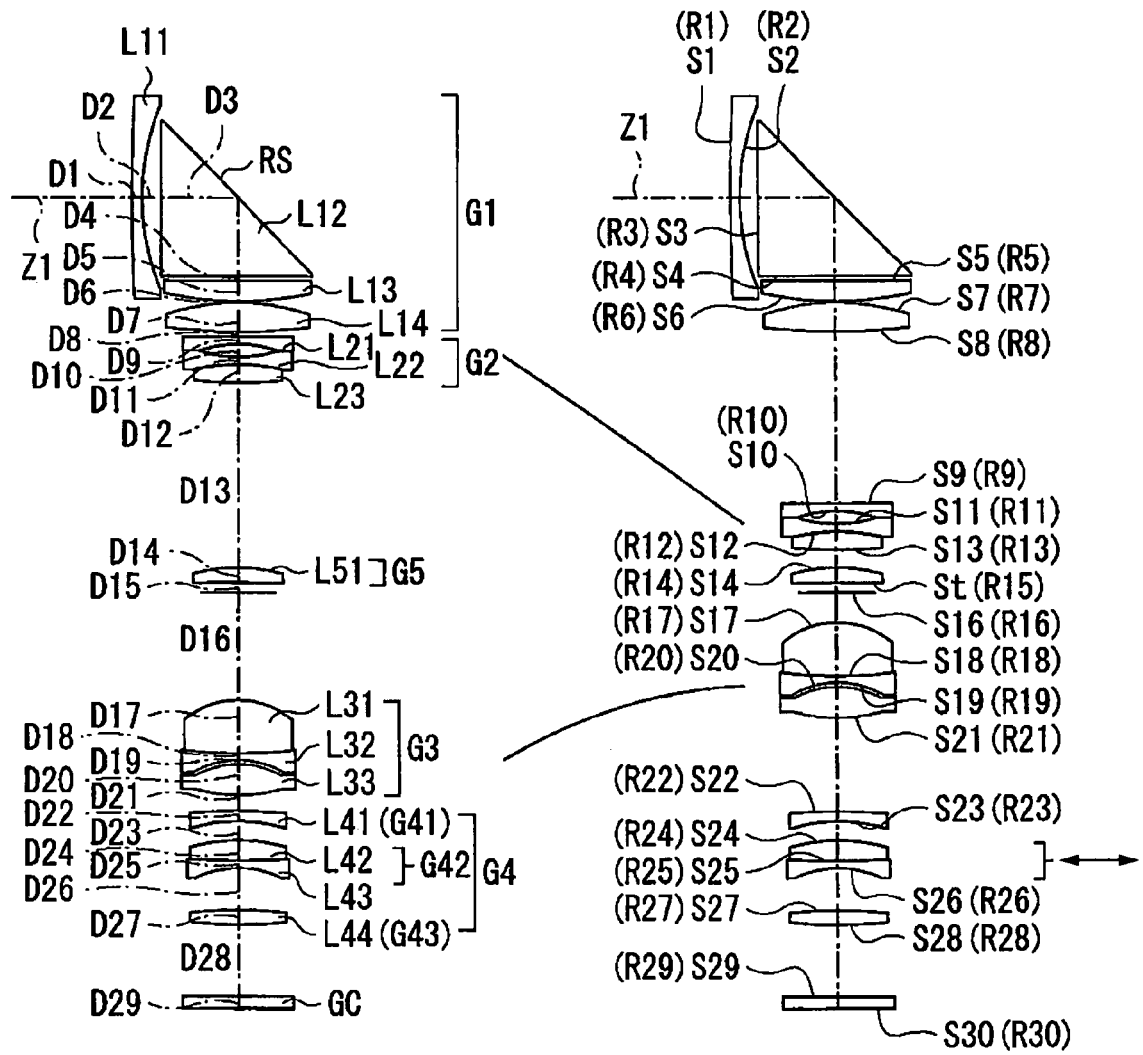

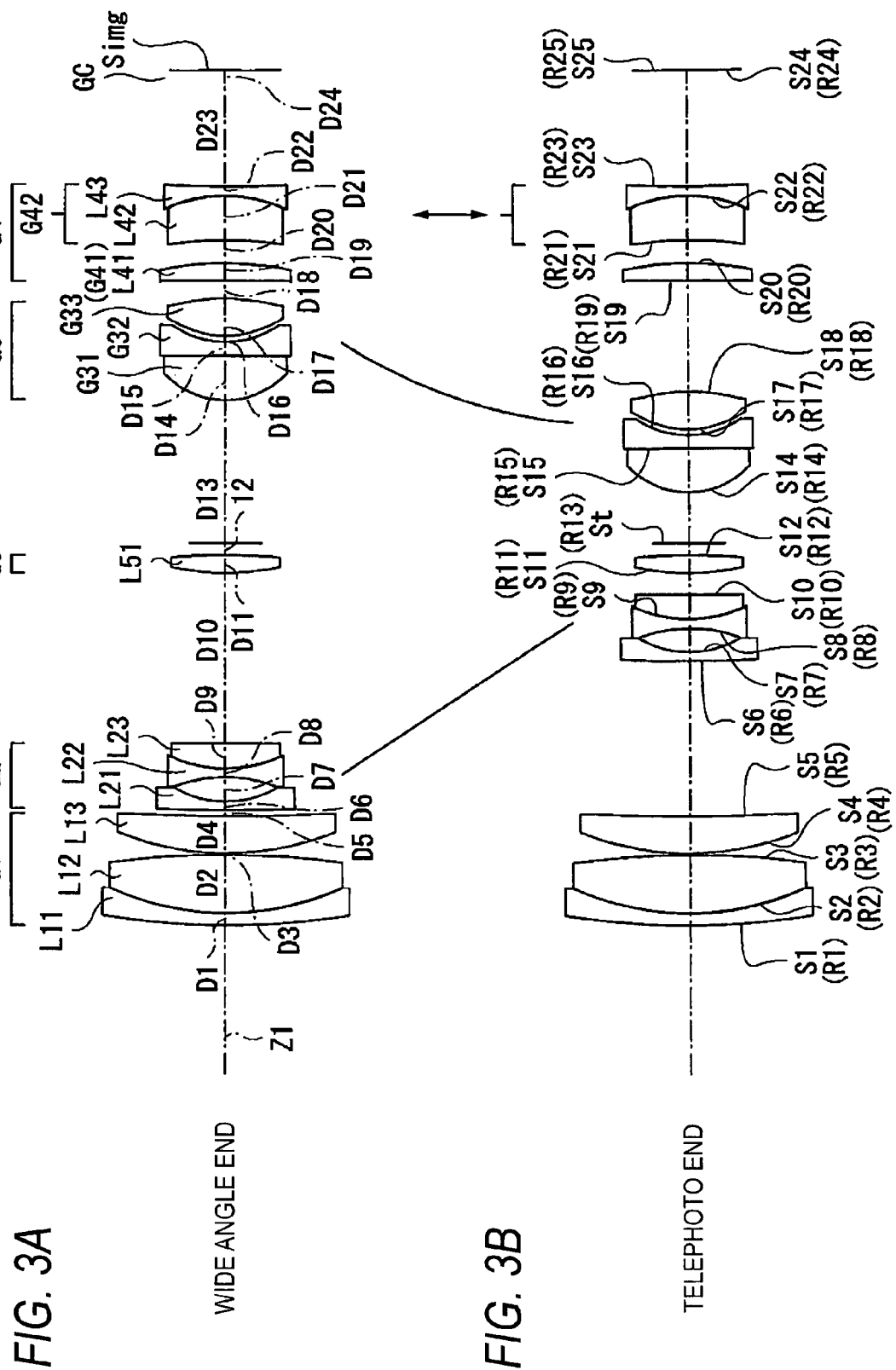

EXAMPLE 4

WIDE ANGLE END

TELEPHOTO END

EXAMPLE 5

WIDE ANGLE END

TELEPHOTO END

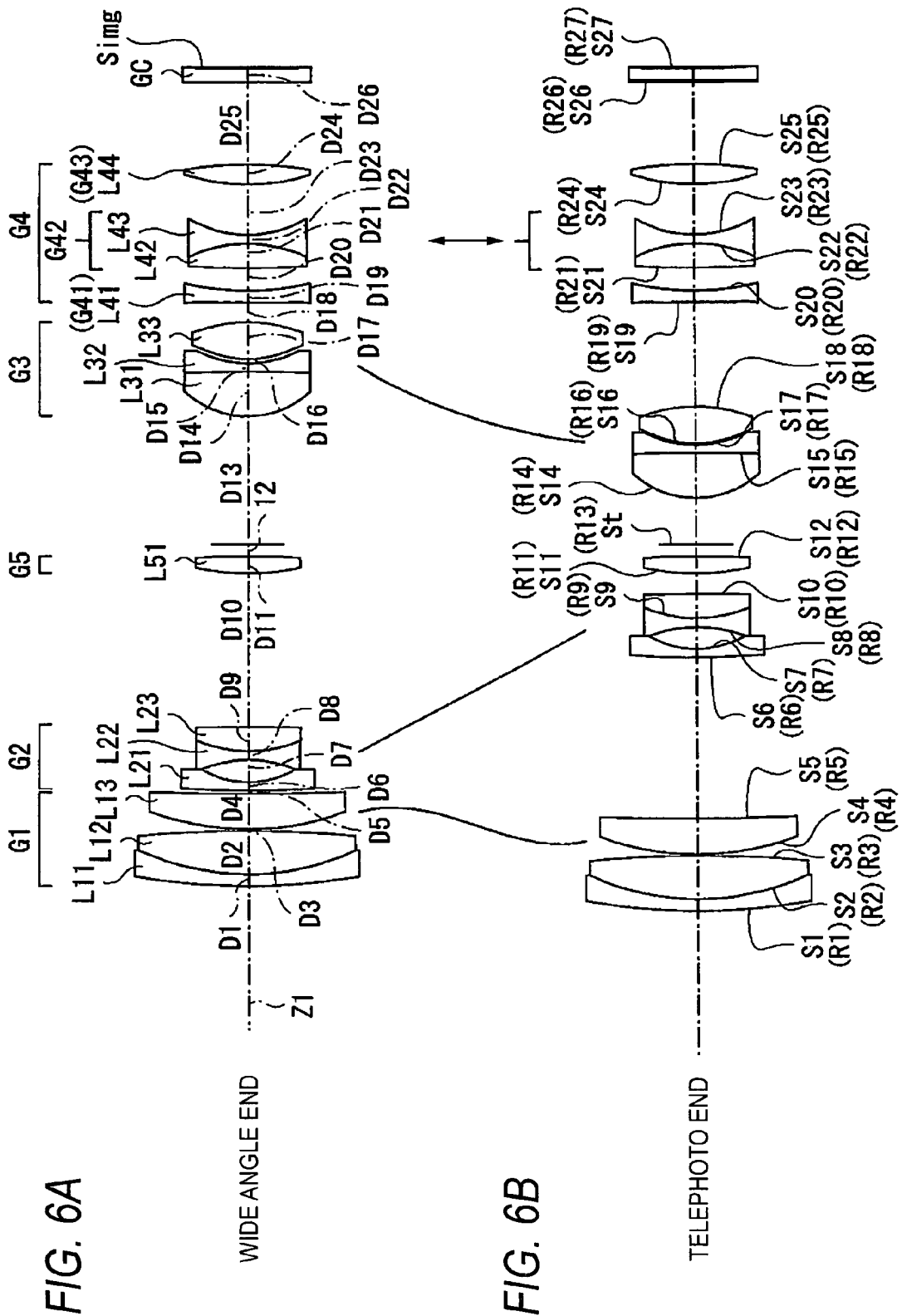

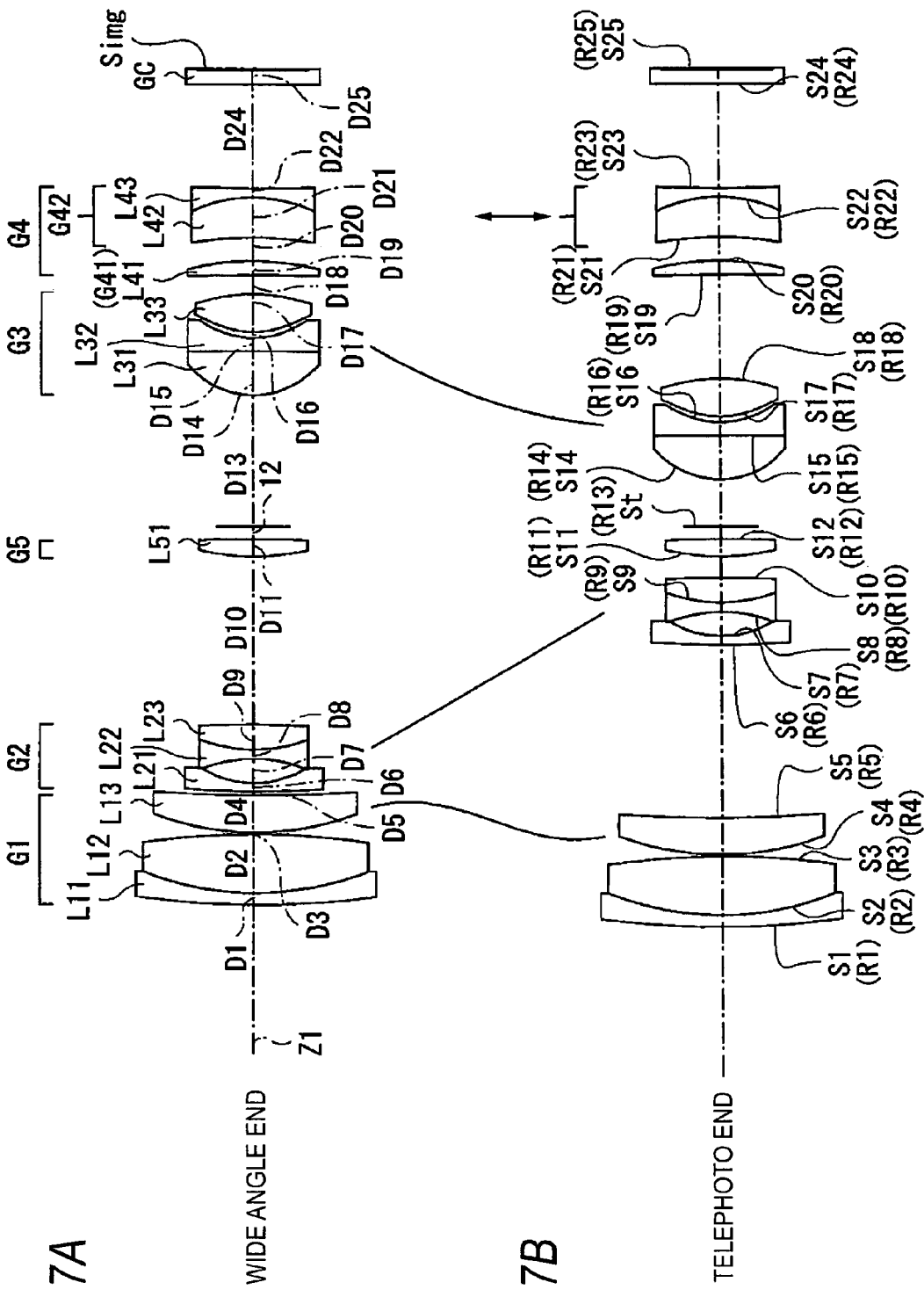
FIG. 7A EXAMPLE 7 WIDE ANGLE END
FIG. 7B TELEPHOTO END

FIG. 8

| | Si (SURFACE NUMBER) | Ri (CURVATURE RADIUS) | Di (SPACING) | Ndi (REFRACTIVE INDEX) | νdj (ABBE NUMBER) |
|---|---|---|---|---|---|
| | \multicolumn{5}{c}{EXAMPLE 1: LENS DATA} | |

| | Si | Ri | Di | Ndi | νdj |
|---|---|---|---|---|---|
| G1 | 1 | 42.6882 | 0.82 | 1.84666 | 23.8 |
| | 2 | 17.7896 | 3.03 | 1.48749 | 70.2 |
| | 3 | -118.5780 | 0.10 | | |
| | 4 | 20.6233 | 2.50 | 1.83481 | 42.7 |
| | 5 | 243.0005 | D5 (VARIABLE) | | |
| G2 | 6 | 149.4677 | 0.60 | 1.88300 | 40.8 |
| | 7 | 7.2762 | 1.59 | | |
| | 8 | -10.0481 | 0.61 | 1.80400 | 46.6 |
| | 9 | 9.4236 | 1.70 | 1.92286 | 18.9 |
| | 10 | -953.5735 | D10(VARIABLE) | | |
| G5 | *11 | 18.7184 | 1.20 | 1.51537 | 61.2 |
| | *12 | -82.4841 | 0.83 | | |
| | 13 (APERTURE DIAPHRAGM) | 0 | D13(VARIABLE) | | |
| G3 | 14 | 6.7343 | 3.16 | 1.51823 | 58.9 |
| | 15 | -188.7006 | 0.55 | 1.90366 | 31.3 |
| | 16 | 8.2233 | 0.10 | | |
| | *17 | 7.1371 | 2.57 | 1.51537 | 61.2 |
| | *18 | -10.7915 | D18(VARIABLE) | | |
| G4 | *19 | -733.4864 | 0.80 | 1.51007 | 56.2 |
| | *20 | 105.9670 | 1.57 | | |
| | 21 | 65.1958 | 1.71 | 1.84666 | 23.8 |
| | 22 | -10.1387 | 0.61 | 1.80610 | 33.3 |
| | 23 | 8.3543 | 3.50 | | |
| | 24 | 16.4967 | 1.40 | 1.51007 | 56.2 |
| | 25 | -25.2668 | 5.93 | | |
| GC | 26 | ∞ | 0.85 | 1.51680 | 64.2 |
| | 27 | ∞ | | | |

(*ASPHERIC SURFACE)(f=6.67~37.72, FNO.=3.58~4.92, 2ω=60.8~10.6°)

FIG. 9

| EXAMPLE 1: ASPHERIC DATA | | | | |
|---|---|---|---|---|
| ASPHERIC COEF-FICIENT | SURFACE NUMBER | | | |
| | 11TH SURFACE | 12TH SURFACE | 17TH SURFACE | 18TH SURFACE |
| K | $-2.722216$ | $9.996895$ | $-4.843698 \times 10^{-1}$ | $-7.050190 \times 10^{-2}$ |
| $A_3$ | $1.524781 \times 10^{-4}$ | $-2.085637 \times 10^{-4}$ | $-1.095996 \times 10^{-4}$ | $6.232465 \times 10^{-5}$ |
| $A_4$ | $-4.677130 \times 10^{-4}$ | $-7.888168 \times 10^{-4}$ | $-2.297588 \times 10^{-4}$ | $4.160197 \times 10^{-5}$ |
| $A_5$ | $8.946269 \times 10^{-5}$ | $-5.537558 \times 10^{-5}$ | $-2.572405 \times 10^{-5}$ | $9.569356 \times 10^{-6}$ |
| $A_6$ | $3.997940 \times 10^{-5}$ | $8.718697 \times 10^{-6}$ | $1.286935 \times 10^{-7}$ | $3.271069 \times 10^{-6}$ |
| $A_7$ | $-1.661844 \times 10^{-5}$ | $1.095845 \times 10^{-5}$ | $3.147007 \times 10^{-7}$ | $-1.261422 \times 10^{-6}$ |
| $A_8$ | $-1.584717 \times 10^{-6}$ | $-4.319985 \times 10^{-6}$ | $2.396267 \times 10^{-8}$ | $-2.958468 \times 10^{-7}$ |
| $A_9$ | $-7.480741 \times 10^{-7}$ | $-1.234365 \times 10^{-6}$ | $-1.273975 \times 10^{-7}$ | $-3.915438 \times 10^{-8}$ |
| $A_{10}$ | $4.220566 \times 10^{-7}$ | $4.415336 \times 10^{-7}$ | $3.925264 \times 10^{-9}$ | $9.460959 \times 10^{-9}$ |
| $A_{11}$ | — | — | $-2.594580 \times 10^{-9}$ | $6.709039 \times 10^{-9}$ |
| $A_{12}$ | — | — | $2.702880 \times 10^{-9}$ | $7.183467 \times 10^{-10}$ |
| | 19TH SURFACE | 20TH SURFACE | | |
| K | $1.131678 \times 10^{-1}$ | $-1.000000 \times 10^{+1}$ | | |
| $A_3$ | — | — | | |
| $A_4$ | $4.828085 \times 10^{-4}$ | $5.548594 \times 10^{-4}$ | | |
| $A_5$ | — | — | | |
| $A_6$ | $-1.776356 \times 10^{-5}$ | $-6.373945 \times 10^{-6}$ | | |
| $A_7$ | — | — | | |
| $A_8$ | $7.759106 \times 10^{-7}$ | $-2.119496 \times 10^{-7}$ | | |
| $A_9$ | — | — | | |
| $A_{10}$ | $-6.930726 \times 10^{-8}$ | $-5.421088 \times 10^{-8}$ | | |
| $A_{11}$ | — | — | | |
| $A_{12}$ | — | — | | |

FIG. 10

| | Si (SURFACE NUMBER) | Ri (CURVATURE RADIUS) | Di (SPACING) | Ndi (REFRACTIVE INDEX) | vdj (ABBE NUMBER) |
|---|---|---|---|---|---|
| | \multicolumn{5}{c}{EXAMPLE 2: LENS DATA} | | | | |
| G1 | 1 | 177.9568 | 0.82 | 1.80518 | 25.4 |
| | 2 | 19.0707 | 1.55 | | |
| | 3 | 0 | 12.80 | 1.78590 | 44.2 |
| | 4 | 0 | 0.04 | | |
| | 5 | 0 | 1.75 | 1.49700 | 81.6 |
| | 6 | -26.1119 | 0.10 | | |
| | *7 | 18.5271 | 2.40 | 1.56865 | 58.6 |
| | *8 | -52.0614 | D8 (VARIABLE) | | |
| G2 | 9 | 0.0000 | 0.60 | 1.88300 | 40.8 |
| | 10 | 9.8340 | 1.08 | | |
| | 11 | -10.6414 | 0.61 | 1.80400 | 46.6 |
| | 12 | 16.2900 | 1.49 | 1.92286 | 18.9 |
| | 13 | -42.6622 | D13(VARIABLE) | | |
| G5 | *14 | 13.5365 | 1.20 | 1.51007 | 56.2 |
| | *15 | 117.0142 | 0.83 | | |
| | 16 (APERTURE DIAPHRAGM) | 0 | D16(VARIABLE) | | |
| G3 | 17 | 7.0919 | 4.39 | 1.51742 | 52.4 |
| | 18 | -38.3920 | 0.55 | 1.90366 | 31.3 |
| | 19 | 7.6854 | 0.10 | | |
| | *20 | 6.8187 | 2.56 | 1.51537 | 61.2 |
| | *21 | -12.5330 | D21(VARIABLE) | | |
| G4 | *22 | 48.4354 | 0.80 | 1.51007 | 56.2 |
| | *23 | 32.6302 | 1.57 | | |
| | 24 | 14.5716 | 1.66 | 1.58144 | 40.7 |
| | 25 | -79.4660 | 0.60 | 1.83481 | 42.7 |
| | 26 | 8.0984 | 3.50 | | |
| | 27 | 38.2981 | 1.20 | 1.51007 | 56.2 |
| | 28 | -37.8512 | 5.98 | | |
| GC | 29 | ∞ | 0.85 | 1.51680 | 64.2 |
| | 30 | ∞ | | | |

(*ASPHERIC SURFACE) (f=6.64~37.56, FNO.=3.91~5.16, 2ω=61.1~10.7° )

FIG. 11

| ASPHERIC COEFFICIENT | SURFACE NUMBER | | | |
|---|---|---|---|---|
| | 7TH SURFACE | 8TH SURFACE | 14TH SURFACE | 15TH SURFACE |
| K | -1.114261 | 9.775309 | -2.527772 | -8.895284 |
| $A_3$ | $9.469078 \times 10^{-5}$ | $1.097736 \times 10^{-4}$ | $5.430622 \times 10^{-4}$ | $-2.429666 \times 10^{-4}$ |
| $A_4$ | $-4.666991 \times 10^{-5}$ | $-8.655037 \times 10^{-5}$ | $-1.567334 \times 10^{-3}$ | $-1.587954 \times 10^{-4}$ |
| $A_5$ | $1.172093 \times 10^{-5}$ | $1.266045 \times 10^{-5}$ | $1.404317 \times 10^{-3}$ | $8.992777 \times 10^{-5}$ |
| $A_6$ | $1.668196 \times 10^{-7}$ | $9.452501 \times 10^{-7}$ | $-4.732695 \times 10^{-4}$ | $5.556187 \times 10^{-5}$ |
| $A_7$ | $-1.080262 \times 10^{-7}$ | $-9.294639 \times 10^{-8}$ | $2.266652 \times 10^{-5}$ | $-3.891868 \times 10^{-5}$ |
| $A_8$ | $-5.719591 \times 10^{-9}$ | $-3.409939 \times 10^{-8}$ | $1.909431 \times 10^{-5}$ | $-3.917994 \times 10^{-6}$ |
| $A_9$ | $1.526661 \times 10^{-9}$ | $-2.359069 \times 10^{-9}$ | $-2.507127 \times 10^{-6}$ | $5.646523 \times 10^{-6}$ |
| $A_{10}$ | $5.504454 \times 10^{-11}$ | $8.737152 \times 10^{-10}$ | $-8.222965 \times 10^{-8}$ | $-8.281749 \times 10^{-7}$ |
| $A_{11}$ | $-8.057206 \times 10^{-11}$ | $6.454548 \times 10^{-11}$ | — | — |
| $A_{12}$ | $1.207121 \times 10^{-11}$ | $-8.492582 \times 10^{-12}$ | — | — |
| | 20TH SURFACE | 21ST SURFACE | 22ND SURFACE | 23RD SURFACE |
| K | $-8.704043 \times 10^{-1}$ | 9.561158 | -1.780362 | 3.327931 |
| $A_3$ | $-4.601722 \times 10^{-4}$ | $5.967004 \times 10^{-5}$ | — | — |
| $A_4$ | $6.801054 \times 10^{-4}$ | $5.725475 \times 10^{-4}$ | $3.390537 \times 10^{-4}$ | $3.415441 \times 10^{-4}$ |
| $A_5$ | $-4.332672 \times 10^{-4}$ | $1.297134 \times 10^{-4}$ | — | — |
| $A_6$ | $9.804183 \times 10^{-5}$ | $-2.241161 \times 10^{-5}$ | $-1.630018 \times 10^{-5}$ | $-1.073634 \times 10^{-5}$ |
| $A_7$ | $1.613143 \times 10^{-5}$ | $-4.065852 \times 10^{-6}$ | — | — |
| $A_8$ | $-3.028458 \times 10^{-6}$ | $3.195022 \times 10^{-6}$ | $8.527859 \times 10^{-7}$ | $5.515057 \times 10^{-7}$ |
| $A_9$ | $-3.035984 \times 10^{-6}$ | $2.383736 \times 10^{-6}$ | — | — |
| $A_{10}$ | $-3.067014 \times 10^{-7}$ | $-1.207690 \times 10^{-6}$ | $-3.952706 \times 10^{-8}$ | $-3.281472 \times 10^{-8}$ |
| $A_{11}$ | $4.977550 \times 10^{-7}$ | $8.753554 \times 10^{-8}$ | — | — |
| $A_{12}$ | $-6.849830 \times 10^{-8}$ | $2.211527 \times 10^{-8}$ | — | — |

EXAMPLE 2: ASPHERIC DATA

FIG. 12

| EXAMPLE 3: LENS DATA ||||||
|---|---|---|---|---|---|
| | Si (SURFACE NUMBER) | Ri (CURVATURE RADIUS) | Di (SPACING) | Ndi (REFRACTIVE INDEX) | νdj (ABBE NUMBER) |
| G1 | 1 | 52.0872 | 0.82 | 1.84666 | 23.8 |
| G1 | 2 | 19.2187 | 4.01 | 1.48749 | 70.2 |
| G1 | 3 | -60.7687 | 0.10 | | |
| G1 | 4 | 19.6997 | 2.50 | 1.83481 | 42.7 |
| G1 | 5 | 130.7837 | D5 (VARIABLE) | | |
| G2 | 6 | 114.4787 | 0.60 | 1.88300 | 40.8 |
| G2 | 7 | 7.2610 | 1.63 | | |
| G2 | 8 | -10.1077 | 0.61 | 1.80400 | 46.6 |
| G2 | 9 | 9.5131 | 1.68 | 1.92286 | 18.9 |
| G2 | 10 | -497.0108 | D10 (VARIABLE) | | |
| G5 | *11 | 15.3132 | 1.20 | 1.51537 | 64.5 |
| G5 | *12 | -105.3576 | 0.83 | | |
| | 13 (APERTURE DIAPHRAGM) | 0 | D13 (VARIABLE) | | |
| G3 | 14 | 6.0011 | 2.98 | 1.51742 | 52.4 |
| G3 | 15 | -429.0579 | 0.90 | 1.90366 | 31.3 |
| G3 | 16 | 6.6729 | 0.10 | | |
| G3 | *17 | 6.2901 | 2.56 | 1.51537 | 64.5 |
| G3 | *18 | -12.4986 | D18 (VARIABLE) | | |
| G4 | *19 | -49.9997 | 1.20 | 1.51007 | 56.2 |
| G4 | *20 | -24.9999 | 1.57 | | |
| G4 | 21 | -26.2344 | 3.00 | 1.84666 | 23.8 |
| G4 | 22 | -10.0000 | 0.61 | 1.83400 | 37.2 |
| G4 | 23 | 86.5775 | 7.00 | | |
| GC | 24 | ∞ | 0.85 | 1.51680 | 64.2 |
| GC | 25 | ∞ | 0 | | |

(*ASPHERIC SURFACE) (f=6.68~37.77, FNO.=3.59~4.88, 2ω=60.7~10.7°)

FIG. 13

| EXAMPLE 3: ASPHERIC DATA | | | | |
|---|---|---|---|---|
| ASPHERIC COEF-FICIENT | SURFACE NUMBER | | | |
| | 11TH SURFACE | 12TH SURFACE | 17TH SURFACE | 18TH SURFACE |
| K | 8.598873 | 9.999996 | $-2.247597 \times 10^{-1}$ | $-1.629417 \times 10^{-1}$ |
| $A_3$ | $1.903100 \times 10^{-4}$ | $-1.956064 \times 10^{-4}$ | $-1.224768 \times 10^{-4}$ | $7.877344 \times 10^{-5}$ |
| $A_4$ | $-8.943302 \times 10^{-4}$ | $-1.060948 \times 10^{-4}$ | $-1.736631 \times 10^{-4}$ | $1.646317 \times 10^{-4}$ |
| $A_5$ | $1.975333 \times 10^{-5}$ | $-1.214368 \times 10^{-4}$ | $-5.158225 \times 10^{-6}$ | $-3.715842 \times 10^{-5}$ |
| $A_6$ | $6.128263 \times 10^{-5}$ | $4.678757 \times 10^{-5}$ | $-1.604743 \times 10^{-5}$ | $1.416140 \times 10^{-5}$ |
| $A_7$ | $-1.843327 \times 10^{-5}$ | $-1.082889 \times 10^{-5}$ | $1.612326 \times 10^{-6}$ | $3.099023 \times 10^{-8}$ |
| $A_8$ | $-1.276656 \times 10^{-6}$ | $5.373038 \times 10^{-6}$ | $4.962231 \times 10^{-7}$ | $-1.718181 \times 10^{-7}$ |
| $A_9$ | $-2.182311 \times 10^{-6}$ | $-3.414313 \times 10^{-6}$ | $-7.924589 \times 10^{-8}$ | $-2.454989 \times 10^{-7}$ |
| $A_{10}$ | $6.594817 \times 10^{-7}$ | $5.910573 \times 10^{-7}$ | $-7.748271 \times 10^{-9}$ | $-1.899561 \times 10^{-8}$ |
| $A_{11}$ | — | — | $-1.937452 \times 10^{-8}$ | $1.586937 \times 10^{-8}$ |
| $A_{12}$ | — | — | $8.057733 \times 10^{-9}$ | $5.350384 \times 10^{-9}$ |
| | 19TH SURFACE | 20TH SURFACE | | |
| K | 9.533237 | 1.854416 | | |
| $A_3$ | — | — | | |
| $A_4$ | $1.019693 \times 10^{-3}$ | $1.151391 \times 10^{-3}$ | | |
| $A_5$ | — | — | | |
| $A_6$ | $-3.283941 \times 10^{-5}$ | $-1.752789 \times 10^{-5}$ | | |
| $A_7$ | — | — | | |
| $A_8$ | $2.759288 \times 10^{-6}$ | $1.723427 \times 10^{-6}$ | | |
| $A_9$ | — | — | | |
| $A_{10}$ | $-1.427833 \times 10^{-7}$ | $-1.324302 \times 10^{-7}$ | | |
| $A_{11}$ | — | — | | |
| $A_{12}$ | — | — | | |

FIG. 14

| | EXAMPLE 4: LENS DATA | | | | |
|---|---|---|---|---|---|
| | Si (SURFACE NUMBER) | Ri (CURVATURE RADIUS) | Di (SPACING) | Ndi (REFRACTIVE INDEX) | νdj (ABBE NUMBER) |
| G1 | 1 | 172.8973 | 0.82 | 1.80518 | 25.4 |
| G1 | 2 | 19.0725 | 1.70 | | |
| G1 | 3 | 0 | 12.80 | 1.78590 | 44.2 |
| G1 | 4 | 0 | 0.05 | | |
| G1 | 5 | 0 | 1.75 | 1.49700 | 81.6 |
| G1 | 6 | -24.8330 | 0.10 | | |
| G1 | *7 | 19.3010 | 2.33 | 1.56865 | 58.6 |
| G1 | *8 | -51.1178 | D8 (VARIABLE) | | |
| G2 | 9 | 1522.1199 | 0.60 | 1.88300 | 40.8 |
| G2 | 10 | 10.3933 | 1.10 | | |
| G2 | 11 | -11.3823 | 0.61 | 1.80400 | 46.6 |
| G2 | 12 | 14.4621 | 1.48 | 1.92286 | 18.9 |
| G2 | 13 | -65.3087 | D13 (VARIABLE) | | |
| G5 | *14 | 14.0083 | 1.20 | 1.51007 | 56.2 |
| G5 | *15 | 106.0167 | 0.50 | | |
| | 16 (APERTURE DIAPHRAGM) | 0 | D16 (VARIABLE) | | |
| G3 | 17 | 6.9073 | 4.41 | 1.51742 | 52.4 |
| G3 | 18 | -38.6270 | 0.55 | 1.90366 | 31.3 |
| G3 | 19 | 7.6784 | 0.10 | | |
| G3 | *20 | 6.7219 | 2.42 | 1.51537 | 61.2 |
| G3 | *21 | -14.7903 | D21 (VARIABLE) | | |
| G4 | *22 | -12.0001 | 0.94 | 1.51007 | 56.2 |
| G4 | *23 | -12.4710 | 1.20 | | |
| G4 | 24 | 12.0308 | 1.51 | 1.56732 | 42.8 |
| G4 | 25 | -47.2705 | 0.60 | 1.83481 | 42.7 |
| G4 | 26 | 10.4630 | 10.62 | | |
| GC | 27 | ∞ | 0.85 | 1.51680 | 64.2 |
| GC | 28 | ∞ | 0 | | |

(*ASPHERIC SURFACE)(f=6.62~37.42, FNO.=3.91~5.24, 2ω=60.8~10.7°)

FIG. 15

| EXAMPLE 4: ASPHERIC DATA | | | | |
|---|---|---|---|---|
| ASPHERIC COEFFICIENT | SURFACE NUMBER | | | |
| | 7TH SURFACE | 8TH SURFACE | 14TH SURFACE | 15TH SURFACE |
| K | $-2.282687 \times 10^{-1}$ | $4.224094$ | $-2.074868$ | $6.143527$ |
| $A_3$ | $-5.333529 \times 10^{-6}$ | $-7.646392 \times 10^{-5}$ | $2.167957 \times 10^{-4}$ | $-3.939462 \times 10^{-4}$ |
| $A_4$ | $-1.047836 \times 10^{-5}$ | $-9.605818 \times 10^{-6}$ | $-9.471110 \times 10^{-4}$ | $1.277095 \times 10^{-4}$ |
| $A_5$ | $8.626238 \times 10^{-6}$ | $3.446245 \times 10^{-6}$ | $7.588708 \times 10^{-4}$ | $-8.834531 \times 10^{-5}$ |
| $A_6$ | $-4.837759 \times 10^{-7}$ | $6.822977 \times 10^{-7}$ | $-1.560820 \times 10^{-4}$ | $1.088654 \times 10^{-4}$ |
| $A_7$ | $-1.056877 \times 10^{-7}$ | $-5.363657 \times 10^{-8}$ | $-2.004646 \times 10^{-5}$ | $-3.202574 \times 10^{-5}$ |
| $A_8$ | $2.942941 \times 10^{-9}$ | $-2.891845 \times 10^{-8}$ | $7.854577 \times 10^{-6}$ | $-2.351212 \times 10^{-6}$ |
| $A_9$ | $2.277486 \times 10^{-9}$ | $-2.651690 \times 10^{-9}$ | $4.675750 \times 10^{-7}$ | $1.941494 \times 10^{-6}$ |
| $A_{10}$ | $1.320479 \times 10^{-11}$ | $6.349347 \times 10^{-10}$ | $-1.787828 \times 10^{-7}$ | $-1.630474 \times 10^{-7}$ |
| $A_{11}$ | $-7.024872 \times 10^{-11}$ | $1.950688 \times 10^{-10}$ | — | — |
| $A_{12}$ | $8.570713 \times 10^{-12}$ | $-2.332688 \times 10^{-11}$ | — | — |
| | 20TH SURFACE | 21ST SURFACE | 22ND SURFACE | 23RD SURFACE |
| K | $-9.029281 \times 10^{-1}$ | $1.000000 \times 10^{+1}$ | $-8.061765$ | $-9.525175$ |
| $A_3$ | $2.654094 \times 10^{-5}$ | $4.088533 \times 10^{-4}$ | — | — |
| $A_4$ | $2.508203 \times 10^{-4}$ | $1.942917 \times 10^{-4}$ | $1.075414 \times 10^{-3}$ | $1.062127 \times 10^{-3}$ |
| $A_5$ | $-4.851378 \times 10^{-5}$ | $2.284477 \times 10^{-4}$ | — | — |
| $A_6$ | $3.696451 \times 10^{-5}$ | $3.516667 \times 10^{-6}$ | $2.237603 \times 10^{-5}$ | $3.299048 \times 10^{-5}$ |
| $A_7$ | $-3.499484 \times 10^{-6}$ | $-1.149131 \times 10^{-5}$ | — | — |
| $A_8$ | $2.038031 \times 10^{-6}$ | $-9.834707 \times 10^{-7}$ | $4.179851 \times 10^{-7}$ | $7.194096 \times 10^{-7}$ |
| $A_9$ | $-1.540702 \times 10^{-6}$ | $2.573554 \times 10^{-6}$ | — | — |
| $A_{10}$ | $-1.472059 \times 10^{-7}$ | $-5.358243 \times 10^{-7}$ | $-7.146514 \times 10^{-8}$ | $-9.231153 \times 10^{-8}$ |
| $A_{11}$ | $1.867195 \times 10^{-7}$ | $-5.488613 \times 10^{-8}$ | — | — |
| $A_{12}$ | $-1.821874 \times 10^{-8}$ | $2.742164 \times 10^{-8}$ | — | — |

FIG. 16

| | EXAMPLE 5: LENS DATA | | | | |
|---|---|---|---|---|---|
| | Si (SURFACE NUMBER) | Ri (CURVATURE RADIUS) | Di (SPACING) | Ndi (REFRACTIVE INDEX) | νdj (ABBE NUMBER) |
| G1 | 1 | 114.6154 | 0.82 | 1.80610 | 40.9 |
| | 2 | 15.0000 | 2.30 | | |
| | 3 | 0 | 9.80 | 1.78590 | 44.2 |
| | 4 | 0 | 0.04 | | |
| | 5 | 0 | 1.75 | 1.49700 | 81.6 |
| | 6 | -18.8036 | 0.10 | | |
| | *7 | 21.4834 | 2.09 | 1.51680 | 64.2 |
| | *8 | -67.3085 | D8 (VARIABLE) | | |
| G2 | 9 | -398.0243 | 0.60 | 1.88300 | 40.8 |
| | 10 | 13.9286 | 1.21 | | |
| | 11 | -9.0975 | 0.61 | 1.51823 | 58.9 |
| | 12 | 23.6944 | 1.70 | 1.92286 | 18.9 |
| | 13 | -74.4781 | D13 (VARIABLE) | | |
| | 14 (APERTURE DIAPHRAGM) | 0 | D14 (VARIABLE) | | |
| G3 | 15 | 7.2665 | 4.41 | 1.70000 | 48.1 |
| | 16 | -17.1513 | 0.55 | 1.90366 | 31.3 |
| | 17 | 7.0723 | 0.10 | | |
| | *18 | 6.0457 | 2.55 | 1.51537 | 61.2 |
| | *19 | -11.7929 | D19 (VARIABLE) | | |
| G4 | *20 | -11.9512 | 1.20 | 1.51007 | 56.2 |
| | *21 | -10.6287 | 1.57 | | |
| | 22 | 14.1263 | 1.66 | 1.78470 | 26.3 |
| | 23 | -61.3994 | 0.60 | 1.83400 | 37.2 |
| | 24 | 6.8672 | 3.50 | | |
| | 25 | 16.2196 | 1.20 | 1.51007 | 56.2 |
| | 26 | 55.5879 | 5.31 | | |
| GC | 27 | ∞ | 0.85 | 1.51680 | 64.2 |
| | 28 | ∞ | | | |

(*ASPHERIC SURFACE)(f=6.66~18.82, FNO.=3.91~5.25, 2ω=61.2~21.0°)

FIG. 17

| EXAMPLE 5: ASPHERIC DATA | | | | |
|---|---|---|---|---|
| ASPHERIC COEF-FICIENT | SURFACE NUMBER | | | |
| | 11TH SURFACE | 12TH SURFACE | 17TH SURFACE | 18TH SURFACE |
| K | -1.042278 | 9.778480 | $-3.327069 \times 10^{-1}$ | 8.305760 |
| $A_3$ | $2.905901 \times 10^{-4}$ | $2.944744 \times 10^{-4}$ | $-5.615551 \times 10^{-4}$ | $-1.750483 \times 10^{-4}$ |
| $A_4$ | $-2.395835 \times 10^{-5}$ | $-4.866526 \times 10^{-5}$ | $5.013008 \times 10^{-4}$ | $7.501379 \times 10^{-4}$ |
| $A_5$ | $1.196718 \times 10^{-5}$ | $6.944967 \times 10^{-6}$ | $-4.344836 \times 10^{-4}$ | $1.263792 \times 10^{-4}$ |
| $A_6$ | $1.151787 \times 10^{-7}$ | $9.452601 \times 10^{-7}$ | $9.798107 \times 10^{-5}$ | $-2.239306 \times 10^{-5}$ |
| $A_7$ | $-1.097841 \times 10^{-7}$ | $-9.122473 \times 10^{-8}$ | $1.613066 \times 10^{-5}$ | $-4.065354 \times 10^{-6}$ |
| $A_8$ | $-5.753939 \times 10^{-9}$ | $-3.405774 \times 10^{-8}$ | $-3.028464 \times 10^{-6}$ | $3.195027 \times 10^{-6}$ |
| $A_9$ | $1.526133 \times 10^{-9}$ | $-2.358465 \times 10^{-9}$ | $-3.035984 \times 10^{-6}$ | $2.383736 \times 10^{-6}$ |
| $A_{10}$ | $5.503816 \times 10^{-11}$ | $8.737263 \times 10^{-10}$ | $-3.067014 \times 10^{-7}$ | $-1.207690 \times 10^{-6}$ |
| $A_{11}$ | $-8.057218 \times 10^{-11}$ | $6.454560 \times 10^{-11}$ | $4.977550 \times 10^{-7}$ | $8.753554 \times 10^{-8}$ |
| $A_{12}$ | $1.207121 \times 10^{-11}$ | $-8.492578 \times 10^{-12}$ | $-6.849830 \times 10^{-8}$ | $2.211527 \times 10^{-8}$ |
| | 19TH SURFACE | 20TH SURFACE | | |
| K | -1.439967 | $9.484119 \times 10^{-1}$ | | |
| $A_3$ | — | — | | |
| $A_4$ | $1.459271 \times 10^{-4}$ | $3.645020 \times 10^{-4}$ | | |
| $A_5$ | — | — | | |
| $A_6$ | $-1.627261 \times 10^{-5}$ | $-1.075277 \times 10^{-5}$ | | |
| $A_7$ | — | — | | |
| $A_8$ | $8.527876 \times 10^{-7}$ | $5.515050 \times 10^{-7}$ | | |
| $A_9$ | — | — | | |
| $A_{10}$ | $-3.952706 \times 10^{-8}$ | $-3.281472 \times 10^{-8}$ | | |
| $A_{11}$ | — | — | | |
| $A_{12}$ | — | — | | |

FIG. 18

| | EXAMPLE 6: LENS DATA | | | | |
|---|---|---|---|---|---|
| | Si (SURFACE NUMBER) | Ri (CURVATURE RADIUS) | Di (SPACING) | Ndi (REFRACTIVE INDEX) | νdj (ABBE NUMBER) |
| G1 | 1 | 47.3506 | 0.82 | 1.84666 | 23.8 |
| G1 | 2 | 18.6577 | 3.03 | 1.48749 | 70.2 |
| G1 | 3 | -91.8226 | 0.10 | | |
| G1 | 4 | 20.1228 | 2.50 | 1.83481 | 42.7 |
| G1 | 5 | 157.8610 | D5 (VARIABLE) | | |
| G2 | 6 | 67.2932 | 0.60 | 1.88300 | 40.8 |
| G2 | 7 | 6.7157 | 1.55 | | |
| G2 | 8 | -9.2365 | 0.61 | 1.80400 | 46.6 |
| G2 | 9 | 9.5868 | 1.70 | 1.92286 | 18.9 |
| G2 | 10 | -183.4700 | D10 (VARIABLE) | | |
| G5 | *11 | 16.6347 | 1.20 | 1.51537 | 61.2 |
| G5 | *12 | -105.0707 | 0.83 | | |
| | 13 (APERTURE DIAPHRAGM) | 0 | D13 (VARIABLE) | | |
| G3 | 14 | 6.7309 | 3.16 | 1.51823 | 58.9 |
| G3 | 15 | -100.6233 | 0.55 | 1.90366 | 31.3 |
| G3 | 16 | 8.3328 | 0.10 | | |
| G3 | *17 | 7.1202 | 2.57 | 1.51537 | 61.2 |
| G3 | *18 | -10.4055 | D18 (VARIABLE) | | |
| G4 | *19 | -200.0001 | 0.80 | 1.51007 | 56.2 |
| G4 | *20 | 172.4082 | 1.57 | | |
| G4 | 21 | 76.2394 | 1.71 | 1.84666 | 23.8 |
| G4 | 22 | -10.0000 | 0.61 | 1.80610 | 33.3 |
| G4 | 23 | 8.4379 | 3.50 | | |
| G4 | 24 | 15.0127 | 1.40 | 1.51007 | 56.2 |
| G4 | 25 | -26.5115 | 5.83 | | |
| GC | 26 | ∞ | 0.85 | 1.51680 | 64.2 |
| GC | 27 | ∞ | | | |

(*ASPHERIC SURFACE)(f=6.65~37.62, FNO.=3.54~4.79, 2ω=60.8~10.6°)

FIG. 19

| EXAMPLE 6: ASPHERIC DATA | | | | |
|---|---|---|---|---|
| ASPHERIC COEF-FICIENT | SURFACE NUMBER | | | |
| | 11TH SURFACE | 12TH SURFACE | 17TH SURFACE | 18TH SURFACE |
| K | -1.667639 | 2.267854 | $-7.598649 \times 10^{-1}$ | $2.454349 \times 10^{-1}$ |
| $A_3$ | $1.486999 \times 10^{-4}$ | $-1.852276 \times 10^{-4}$ | $-1.090279 \times 10^{-4}$ | $5.255578 \times 10^{-5}$ |
| $A_4$ | $-3.852454 \times 10^{-4}$ | $-4.654726 \times 10^{-5}$ | $-1.926742 \times 10^{-4}$ | $5.667912 \times 10^{-5}$ |
| $A_5$ | $7.729834 \times 10^{-5}$ | $-4.155157 \times 10^{-5}$ | $-2.564224 \times 10^{-5}$ | $1.316087 \times 10^{-5}$ |
| $A_6$ | $4.194216 \times 10^{-5}$ | $1.028358 \times 10^{-5}$ | $6.936155 \times 10^{-7}$ | $3.450048 \times 10^{-6}$ |
| $A_7$ | $-1.940489 \times 10^{-5}$ | $8.021508 \times 10^{-6}$ | $4.225065 \times 10^{-7}$ | $-1.312922 \times 10^{-6}$ |
| $A_8$ | $-2.415172 \times 10^{-6}$ | $-5.484567 \times 10^{-6}$ | $2.900151 \times 10^{-8}$ | $-2.988991 \times 10^{-7}$ |
| $A_9$ | $-5.053879 \times 10^{-7}$ | $-1.156725 \times 10^{-6}$ | $-1.367054 \times 10^{-7}$ | $-4.076753 \times 10^{-9}$ |
| $A_{10}$ | $4.790408 \times 10^{-7}$ | $5.590345 \times 10^{-7}$ | $-1.849807 \times 10^{-9}$ | $9.262234 \times 10^{-9}$ |
| $A_{11}$ | — | — | $-3.111158 \times 10^{-9}$ | $6.374066 \times 10^{-9}$ |
| $A_{12}$ | — | — | $2.921143 \times 10^{-9}$ | $6.352191 \times 10^{-10}$ |
| | 19TH SURFACE | 20TH SURFACE | | |
| K | 5.748189 | $1.166953 \times 10^{-1}$ | | |
| $A_3$ | — | — | | |
| $A_4$ | $4.937421 \times 10^{-4}$ | $5.831560 \times 10^{-4}$ | | |
| $A_5$ | — | — | | |
| $A_6$ | $-1.662440 \times 10^{-5}$ | $-8.306310 \times 10^{-6}$ | | |
| $A_7$ | — | — | | |
| $A_8$ | $6.276330 \times 10^{-7}$ | $-1.313763 \times 10^{-7}$ | | |
| $A_9$ | — | — | | |
| $A_{10}$ | $-5.470231 \times 10^{-8}$ | $-4.648239 \times 10^{-8}$ | | |
| $A_{11}$ | — | — | | |
| $A_{12}$ | — | — | | |

FIG. 20

| | EXAMPLE 7: LENS DATA | | | | |
|---|---|---|---|---|---|
| | Si (SURFACE NUMBER) | Ri (CURVATURE RADIUS) | Di (SPACING) | Ndi (REFRACTIVE INDEX) | νdj (ABBE NUMBER) |
| G1 | 1 | 59.8321 | 0.82 | 1.84666 | 23.8 |
| G1 | 2 | 20.9253 | 4.01 | 1.48749 | 70.2 |
| G1 | 3 | -56.2832 | 0.10 | | |
| G1 | 4 | 19.7020 | 2.50 | 1.83481 | 42.7 |
| G1 | 5 | 91.4807 | D5 (VARIABLE) | | |
| G2 | 6 | 63.2632 | 0.60 | 1.88300 | 40.8 |
| G2 | 7 | 6.8181 | 1.65 | | |
| G2 | 8 | -9.9184 | 0.61 | 1.80400 | 46.6 |
| G2 | 9 | 10.5004 | 1.68 | 1.92286 | 18.9 |
| G2 | 10 | -102.9442 | D10 (VARIABLE) | | |
| G5 | *11 | 13.4857 | 1.20 | 1.51537 | 64.5 |
| G5 | *12 | -541.0554 | 0.83 | | |
| | 13 (APERTURE DIAPHRAGM) | 0 | D13 (VARIABLE) | | |
| G3 | 14 | 5.8870 | 2.98 | 1.51742 | 52.4 |
| G3 | 15 | -512.3292 | 0.90 | 1.90366 | 31.3 |
| G3 | 16 | 6.3401 | 0.10 | | |
| G3 | *17 | 6.0301 | 2.56 | 1.51537 | 64.5 |
| G3 | *18 | -11.9612 | D18 (VARIABLE) | | |
| G4 | *19 | -50.0000 | 0.95 | 1.51007 | 56.2 |
| G4 | *20 | -25.0016 | 1.57 | | |
| G4 | 21 | -25.6536 | 2.69 | 1.84666 | 23.8 |
| G4 | 22 | -10.0000 | 0.61 | 1.83400 | 37.2 |
| G4 | 23 | 118.7474 | 6.99 | | |
| GC | 24 | ∞ | 0.85 | 1.51680 | 64.2 |
| GC | 25 | ∞ | | | |

(*ASPHERIC SURFACE)(f=6.64∼37.57, FNO.=3.55∼4.73, 2ω=61.0∼10.8°)

FIG. 21

| EXAMPLE 7: ASPHERIC DATA | | | | |
|---|---|---|---|---|
| ASPHERIC COEF- FICIENT | SURFACE NUMBER | | | |
| | 11TH SURFACE | 12TH SURFACE | 17TH SURFACE | 18TH SURFACE |
| K | 6.951905 | -2.677339 | $-2.458607 \times 10^{-1}$ | $-2.557259 \times 10^{-1}$ |
| $A_3$ | $1.087777 \times 10^{-4}$ | $-2.231858 \times 10^{-4}$ | $-1.304976 \times 10^{-4}$ | $3.520444 \times 10^{-6}$ |
| $A_4$ | $-8.773418 \times 10^{-4}$ | $-9.836370 \times 10^{-5}$ | $-2.629839 \times 10^{-4}$ | $1.039087 \times 10^{-4}$ |
| $A_5$ | $-2.737252 \times 10^{-5}$ | $-1.827732 \times 10^{-4}$ | $4.309325 \times 10^{-6}$ | $-6.101672 \times 10^{-5}$ |
| $A_6$ | $3.287892 \times 10^{-5}$ | $6.412901 \times 10^{-5}$ | $-1.382828 \times 10^{-5}$ | $1.608484 \times 10^{-5}$ |
| $A_7$ | $1.541360 \times 10^{-5}$ | $-6.184156 \times 10^{-6}$ | $2.511048 \times 10^{-6}$ | $2.532092 \times 10^{-6}$ |
| $A_8$ | $-1.267938 \times 10^{-5}$ | $2.501286 \times 10^{-6}$ | $1.706706 \times 10^{-7}$ | $-4.222362 \times 10^{-7}$ |
| $A_9$ | $-2.012344 \times 10^{-6}$ | $-4.879815 \times 10^{-6}$ | $-1.551422 \times 10^{-7}$ | $-3.216061 \times 10^{-7}$ |
| $A_{10}$ | $1.026836 \times 10^{-6}$ | $1.063851 \times 10^{-6}$ | $-4.866763 \times 10^{-8}$ | $-4.315472 \times 10^{-8}$ |
| $A_{11}$ | — | — | $-3.216703 \times 10^{-8}$ | $5.181295 \times 10^{-9}$ |
| $A_{12}$ | — | — | $1.093367 \times 10^{-8}$ | $5.686715 \times 10^{-9}$ |
| | 19TH SURFACE | 20TH SURFACE | | |
| K | 9.999984 | 6.531912 | | |
| $A_3$ | — | — | | |
| $A_4$ | $4.175320 \times 10^{-4}$ | $5.681080 \times 10^{-4}$ | | |
| $A_5$ | — | — | | |
| $A_6$ | $-2.677919 \times 10^{-5}$ | $-2.141387 \times 10^{-5}$ | | |
| $A_7$ | — | — | | |
| $A_8$ | $4.025597 \times 10^{-6}$ | $3.189592 \times 10^{-6}$ | | |
| $A_9$ | — | — | | |
| $A_{10}$ | $-1.858930 \times 10^{-7}$ | $-1.627580 \times 10^{-7}$ | | |
| $A_{11}$ | — | — | | |
| $A_{12}$ | — | — | | |

FIG. 22

| EXAMPLE 1: MISCELLANEOUS LENS DATA | | | | | |
|---|---|---|---|---|---|
| | f | D5 | D10 | D13 | D18 |
| WIDE ANGLE END | 6.67 | 0.40 | 11.93 | 9.51 | 1.50 |
| TELEPHOTO END | 37.72 | 10.81 | 1.51 | 3.39 | 7.61 |

FIG. 23

| EXAMPLE 2: MISCELLANEOUS LENS DATA | | | | | |
|---|---|---|---|---|---|
| | f | D8 | D13 | D16 | D21 |
| WIDE ANGLE END | 6.64 | 0.40 | 15.44 | 8.82 | 1.50 |
| TELEPHOTO END | 37.56 | 14.38 | 1.46 | 2.46 | 7.86 |

FIG. 24

| EXAMPLE 3: MISCELLANEOUS LENS DATA | | | | | |
|---|---|---|---|---|---|
| | f | D5 | D10 | D13 | D18 |
| WIDE ANGLE END | 6.68 | 0.40 | 11.71 | 9.68 | 1.50 |
| TELEPHOTO END | 37.77 | 10.65 | 1.46 | 3.41 | 7.77 |

FIG. 25

| EXAMPLE 4: MISCELLANEOUS LENS DATA | | | | | |
|---|---|---|---|---|---|
| | f | D8 | D13 | D16 | D21 |
| WIDE ANGLE END | 6.62 | 0.40 | 15.26 | 9.69 | 1.50 |
| TELEPHOTO END | 37.42 | 14.21 | 1.44 | 3.05 | 8.14 |

FIG. 26

| EXAMPLE 5: MISCELLANEOUS LENS DATA | | | | | |
|---|---|---|---|---|---|
| | f | D8 | D13 | D14 | D19 |
| WIDE ANGLE END | 6.66 | 0.40 | 12.08 | 7.09 | 1.50 |
| TELEPHOTO END | 18.82 | 9.78 | 2.70 | 2.39 | 6.20 |

FIG. 27

| EXAMPLE 6: MISCELLANEOUS LENS DATA | | | | | |
|---|---|---|---|---|---|
| | f | D5 | D10 | D13 | D18 |
| WIDE ANGLE END | 6.65 | 0.21 | 10.87 | 8.94 | 1.58 |
| TELEPHOTO END | 37.62 | 11.33 | 1.47 | 3.25 | 7.27 |

FIG. 28

| EXAMPLE 7: MISCELLANEOUS LENS DATA | | | | | |
|---|---|---|---|---|---|
| | f | D5 | D10 | D13 | D18 |
| WIDE ANGLE END | 6.64 | 0.26 | 11.34 | 8.88 | 1.56 |
| TELEPHOTO END | 37.57 | 11.71 | 1.40 | 3.16 | 7.28 |

FIG. 29

| | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| $(1-\beta tSL) \cdot \beta tr$ | -0.73 | -0.57 | -0.37 | -0.31 | -0.50 | -0.73 | -0.35 |
| S (WHEN CORRECTION ANGLE OF VIEW IS 0.5 DEGREE) | 0.45 | 0.57 | 0.88 | 1.04 | 0.33 | 0.45 | 0.93 |

EXAMPLE 1 (WIDE ANGLE END)

EXAMPLE 1 (TELEPHOTO END)

EXAMPLE 2 (WIDE ANGLE END)

EXAMPLE 2 (TELEPHOTO END)

EXAMPLE 3 (WIDE ANGLE END)

FNO. = 3.59
—— 587.6nm
—·— 460nm
——— 615nm
−0.1μm   0.1μm
SPHERICAL ABERRATION

ω = 30.4°
—— SAGITTAL
---- TANGENTIAL
−0.1μm   0.1μm
ASTIGMATISM

ω = 30.4°
−5%   5%
DISTORTION

ω = 30.4°
−10μm   10μm
LATERAL COLOR

EXAMPLE 3 (TELEPHOTO END)

FNO. = 4.88
—— 587.6nm
—·— 460nm
      615nm
−0.1μm   0.1μm
SPHERICAL ABERRATION

ω = 5.4°
—— SAGITTAL
---- TANGENTIAL
−0.1μm   0.1μm
ASTIGMATISM

ω = 5.4°
−5%   5%
DISTORTION

ω = 5.4°
−10μm   10μm
LATERAL COLOR

EXAMPLE 4 (WIDE ANGLE END)
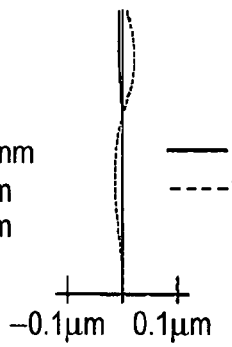
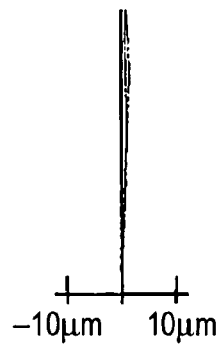
FIG. 36A    FIG. 36B    FIG. 36C    FIG. 36D
EXAMPLE 4 (TELEPHOTO END)
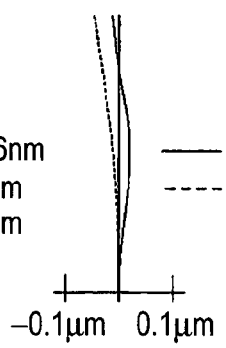
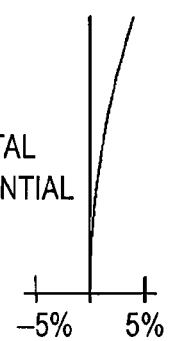
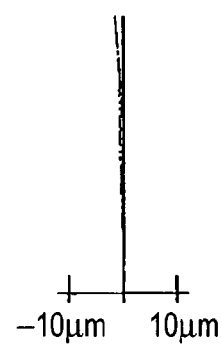
FIG. 37A    FIG. 37B    FIG. 37C    FIG. 37D EXAMPLE 5 (WIDE ANGLE END)
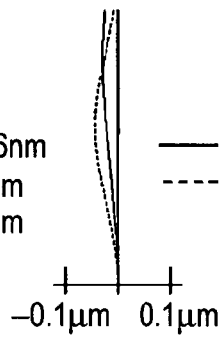
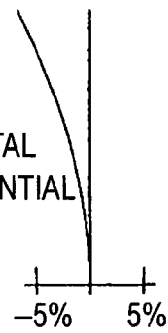
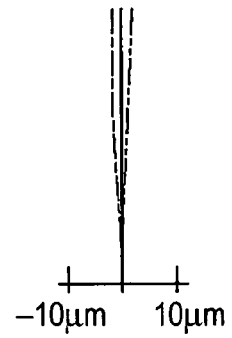
FIG. 38A    FIG. 38B    FIG. 38C    FIG. 38D
EXAMPLE 5 (TELEPHOTO END)
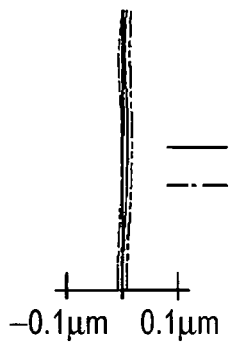
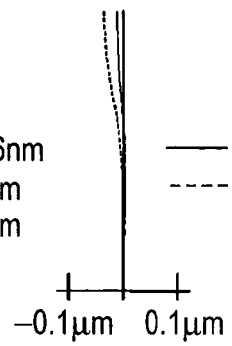
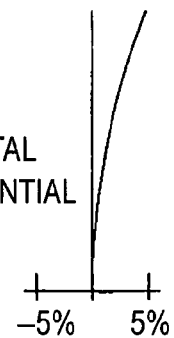
FIG. 39A    FIG. 39B    FIG. 39C    FIG. 39D

EXAMPLE 6 (WIDE ANGLE END)

EXAMPLE 6 (TELEPHOTO END)

EXAMPLE 1
AT USUAL TIME
(WHEN CORRECTION ANGLE OF VIEW IS 0.5 DEGREE AND SECOND SUBLENS GROUP G42 MOVES.)
FIG. 44A 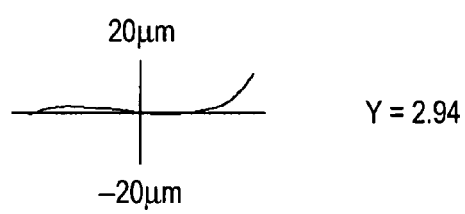 Y = 2.94 FIG. 44D 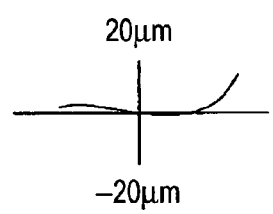
FIG. 44B 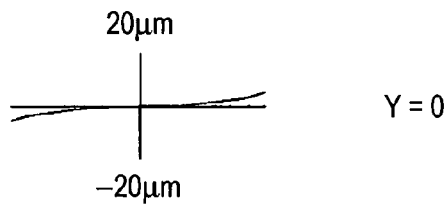 Y = 0 FIG. 44E 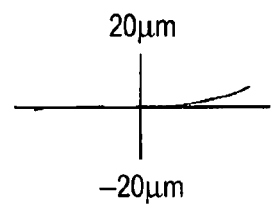
FIG. 44C 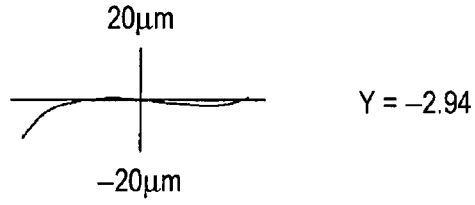 Y = −2.94 FIG. 44F 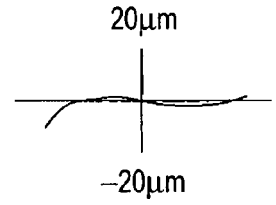

EXAMPLE 2

AT USUAL TIME (WHEN CORRECTION ANGLE OF VIEW IS 0.5 DEGREE AND SECOND SUBLENS GROUP G42 MOVES.)

Y = 2.94

Y = 0

Y = −2.94

EXAMPLE 3

AT USUAL TIME (WHEN CORRECTION ANGLE OF VIEW IS 0.5 DEGREE AND SECOND SUBLENS GROUP G42 MOVES.)

Y = 2.94

Y = 0

Y = −2.94

EXAMPLE 4

AT USUAL TIME (WHEN CORRECTION ANGLE OF VIEW IS 0.5 DEGREE AND SECOND SUBLENS GROUP G42 MOVES.)

Y = 2.94

Y = 0

Y = −2.94

EXAMPLE 5

AT USUAL TIME (WHEN CORRECTION ANGLE OF VIEW IS 0.5 DEGREE AND SECOND SUBLENS GROUP G42 MOVES.)

Y = 2.94

Y = 0

Y = -2.94

EXAMPLE 6

AT USUAL TIME (WHEN CORRECTION ANGLE OF VIEW IS 0.5 DEGREE AND SECOND SUBLENS GROUP G42 MOVES.)

Y = 2.94

Y = 0

Y = −2.94

EXAMPLE 7

AT USUAL TIME (WHEN CORRECTION ANGLE OF VIEW IS 0.5 DEGREE AND SECOND SUBLENS GROUP G42 MOVES.)

Y = 2.94

Y = 0

Y = −2.94

VARIABLE POWER OPTICAL SYSTEM

BACKGROUND OF THE INVENTION

1. Field of the Invention

This invention relates to a variable power optical system suited to installation in a compact digital still camera (digital camera), a consumer video camera, etc.

2. Description of Related Art

To take a photograph with a digital camera, a consumer video camera, etc., if vibration is caused by hand movement of the photographer or for any other reason, blurring of the photograph image occurs, resulting in degradation of the image. To prevent such image blurring, hitherto, a method of moving some lens of a photograph optical system in the perpendicular direction to the optical axis as a correction lens group and optically correcting image blurring has been known. (For example, refer to Japanese Patent Nos. 2535969, 2560377 and 2605326.)

Japanese Patent No. 2535969 discloses a variable power optical system including a first lens group I fixed at the variable power time and a second lens group II and a third lens group III moving along the optical axis at the variable power time wherein any one of the first lens group I to the third lens group III is moved in the direction orthogonal to the optical axis, thereby correcting blurring of a photograph image accompanying vibration, for example, as shown in FIG. 4 of the patent.

Japanese Patent No. 2560377 discloses a variable power optical system including a negative first lens group I fixed at the variable power time and a positive second lens group II and a negative third lens group III moving along the optical axis at the variable power time wherein the second lens group II is moved in the direction orthogonal to the optical axis, thereby correcting blurring of a photograph image accompanying vibration, for example, as shown in FIG. 4 of the patent.

Japanese Patent No. 2605326 discloses a variable power optical system including a negative first lens group I fixed at the variable power time and a positive second lens group II and a negative third lens group III moving along the optical axis at the variable power time wherein the third lens group III is moved in the direction orthogonal to the optical axis, thereby correcting blurring of a photograph image accompanying vibration, for example, as shown in FIG. 4 of the patent.

Further, JP-A-2006-23593 discloses a zoom lens including a positive first lens group G1, a negative second lens group G2 moving along the optical axis at the variable power time, a positive third lens group G3, a positive fourth lens group G4 moving along the optical axis at the variable power time, and a positive fifth lens group G5 in order wherein a positive partial group of some lens of the fifth lens group G5 is shifted in the direction orthogonal to the optical axis, thereby shifting an image, for example, as shown in FIG. 2 of the publication.

However, in the variable power optical systems in the patents described above, the occupation ratio of the lens group for making image blurring correction (which will be hereinafter referred to as correction lens group) to the overall configuration is comparatively large and thus electric and mechanical loads on the drive section for driving the correction lens group are not small and in addition, it is disadvantageous for compacting the overall configuration. Particularly, if the correction lens group also functions as a variable power group for performing the variable power operation, the load on the drive section particularly grows and in addition, the mechanism also easily becomes complicated. Since the lenses (group) preceding and following the correction lens group are a variable power group for performing the variable power operation, it is difficult to enhance the sealing performance because of the mechanism and it is feared that foreign material of dust, etc., may enter the inside and be deposited. Particularly, if the last lens group (lens group nearest to the image side) is a variable power group and is a moving group as in the variable power optical system in Japanese patent No. 2605326, dust is easily deposited on the last lens group, in which case the effect of shading appears in the photograph image.

In the zoom lens in JP-A-2006-23593 described above, the overall length tends to become long and compactibility is insufficient.

SUMMARY OF THE INVENTION

An object of an illustrative, non-limiting embodiment of the invention is to provide a variable power optical system having a sufficient correction function to image blurring caused by vibration, inclination, etc., and capable of exerting good optical performance while it has a compacter and simpler configuration.

According to one aspect of the invention, there is provided a variable power optical system including: in order from the object side, a first lens group having a positive refractive power; a second lens group having a negative refractive power; a third lens group having a positive refractive power; and a fourth lens group having a negative refractive power and containing a plurality of sub lens groups. The second lens group is moved along the optical axis, thereby performing variable power (varying a power of the system) and the third lens group is moved along the optical axis, thereby correcting image surface variation caused by the variable power and performing focusing of the system. The fourth lens group is fixed at the variable power time (at the time of the varying of the power of the system) and the focusing time (at the time of the focusing of the system) and one of the plurality of sub lens groups moves in a direction perpendicular to the optical axis, thereby moving an image.

In the variable power optical system, only one of the sub lens groups contained in the fourth lens group fixed at the variable power time and the focusing time moves in the perpendicular direction to the optical axis, thereby moving the image and correcting image blurring caused by vibration, inclination, etc. Thus, the fourth lens group exerts a sufficient correction function and the occupation ratio to the whole configuration becomes comparatively small. Since the first to fourth lens groups have positive, negative, positive, and negative refractive powers in order, the position of the image side principal point of the whole system is made nearer to the object side. Therefore, the back focus becomes short and it is advantageous for shortening the overall length. Here, the fact that the refractive power of the fourth lens group is negative contributes largely to shortening of the overall length.

In the variable power optical system, the fourth lens group may have first to third sub lens groups placed in order from the object side and the whole of the second sub lens group moves in the direction perpendicular to the optical axis, thereby moving the image and correcting image blurring caused by vibration, inclination, etc. In this case, the second sub lens group functioning as an image blurring correction lens group is sandwiched between the first and third sub lens groups not moving at variable power and at focusing. The third sub lens group can consist of a single lens having positive refractive power, for example. The third sub lens group is provided, whereby the emission angle of a light beam toward the image formation surface is easily lessened and the sensitivity of image blurring correction of the second sub lens group enhances. The first and second sub lens groups may make up the fourth lens group without containing the third sub lens group. In this case, the whole configuration is more simplified.

In the variable power optical system, a single lens having at least one surface as an aspheric surface may be used as the first sub lens group. In this case, it becomes easy to correct field curvature and distortion. Preferably, the second sub lens group is a cemented lens including a positive lens and a negative lens placed in order from the object side. It is advantageous for decreasing spherical aberration and chromatic aberration.

In the variable power optical system, preferably the following conditional expression (1) is satisfied:

$$0.3<|(1-\beta tSL)\times\beta tr|<1.0 \quad (1)$$

where $\beta tSL$ is an imaging magnification at the telephoto end in the second sub lens group and $\beta tr$ is an imaging magnification at the telephoto end in the whole lens positioned to the image side rather than the second sub lens group (1 if a lens positioned to the image side rather than the second sub lens group does not exist). As conditional expression (1) is satisfied, for example, the correction angle of view at the telephoto end can be set to 0.5° and the balance between the sensitivity of image blurring correction and the move distance of the image blurring correction lens group is made more appropriate.

In the variable power optical system, the first lens group may include a single lens having negative refractive power with a concave surface directed to the image side, an optical path diverting member for bending an optical path, and at least one single lens having positive refractive power in order from the object side. In so doing, the space is used efficiently and the variable power optical system becomes suited to installation in an imaging apparatus such as a slimmed camera, for example.

The variable power optical system may further include a fixed fifth lens group having positive refractive power between the second lens group and the third lens group. As the fifth lens group is provided, it becomes advantageous for increasing the variable power ratio.

BRIEF DESCRIPTION OF THE DRAWINGS

The features of the invention will appear more fully upon consideration of the exemplary embodiment of the invention, which are schematically set forth in the drawings, in which:

FIG. 2 shows one configuration example of the variable power optical system as a second exemplary embodiment of the invention and is a sectional view corresponding to example 2;

FIG. 3 shows one configuration example of the variable power optical system as a third exemplary embodiment of the invention and is a sectional view corresponding to example 3;

FIG. 6 shows one configuration example of the variable power optical system as a sixth exemplary embodiment of the invention and is a sectional view corresponding to example 6;

FIG. 7 shows one configuration example of the variable power optical system as a seventh exemplary embodiment of the invention and is a sectional view corresponding to example 7;

FIG. 8 is a schematic representation to show lens data in the variable power optical system of example 1;

FIG. 9 is a schematic representation to show aspheric data in the variable power optical system of example 1;

FIG. 10 is a schematic representation to show lens data in the variable power optical system of example 2;

FIG. 11 is a schematic representation to show aspheric data in the variable power optical system of example 2;

FIG. 12 is a schematic representation to show lens data in the variable power optical system of example 3;

FIG. 13 is a schematic representation to show aspheric data in the variable power optical system of example 3;

FIG. 14 is a schematic representation to show lens data in the variable power optical system of example 4;

FIG. 15 is a schematic representation to show aspheric data in the variable power optical system of example 4;

FIG. 16 is a schematic representation to show lens data in the variable power optical system of example 5;

FIG. 17 is a schematic representation to show aspheric data in the variable power optical system of example 5;

FIG. 18 is a schematic representation to show lens data in the variable power optical system of example 6;

FIG. 19 is a schematic representation to show aspheric data in the variable power optical system of example 6;

FIG. 20 is a schematic representation to show lens data in the variable power optical system of example 7;

FIG. 21 is a schematic representation to show aspheric data in the variable power optical system of example 7;

FIG. 22 is a schematic representation to show miscellaneous lens data in the variable power optical system of example 1;

FIG. 23 is a schematic representation to show miscellaneous lens data in the variable power optical system of example 2;

FIG. 24 is a schematic representation to show miscellaneous lens data in the variable power optical system of example 3;

FIG. 25 is a schematic representation to show miscellaneous lens data in the variable power optical system of example 4;

FIG. 26 is a schematic representation to show miscellaneous lens data in the variable power optical system of example 5;

FIG. 27 is a schematic representation to show miscellaneous lens data in the variable power optical system of example 6;

FIG. 28 is a schematic representation to show miscellaneous lens data in the variable power optical system of example 7;

FIG. 29 is a representation to show the values concerning conditional expression (1) collectively for the examples;

FIG. 36 is an aberration drawing to show spherical aberration, astigmatism, distortion, and lateral color at the wide angle end in the variable power optical system of example 4;

FIG. 37 is an aberration drawing to show spherical aberration, astigmatism, distortion, and lateral color at the telephoto end in the variable power optical system of example 4;

FIG. 38 is an aberration drawing to show spherical aberration, astigmatism, distortion, and lateral color at the wide angle end in the variable power optical system of example 5;

FIG. 39 is an aberration drawing to show spherical aberration, astigmatism, distortion, and lateral color at the telephoto end in the variable power optical system of example 5;

FIG. 44 is a lateral aberration drawing to show performance change at the image blurring correction time at the telephoto end in the variable power optical system of example 1 as compared with that in the usual state;

DETAILED DESCRIPTION OF THE EXEMPLARY EMBODIMENTS

Although the invention will be described below with reference to the exemplary embodiments thereof, the following exemplary embodiments and modifications do not restrict the invention.

According to one aspect of the invention, the second lens group of the first to fourth lens groups have positive, negative, positive, and negative refractive powers in order is used as a variable power group for performing variable power, the third lens group is used as a moving group for correcting image surface variation caused by the variable power and performing focusing, and only one of the sub lens groups in the fourth lens group fixed at the variable power time and the focusing time is used as a correction group for correcting image blurring caused by vibration, inclination, etc. Thus, the sufficiently good image blurring correction function can be exerted and the simple and compact configuration as a whole can be implemented.

Embodiments of the invention will be discussed in detail with reference to the accompanying drawings.

First Embodiment

Figure 1A:
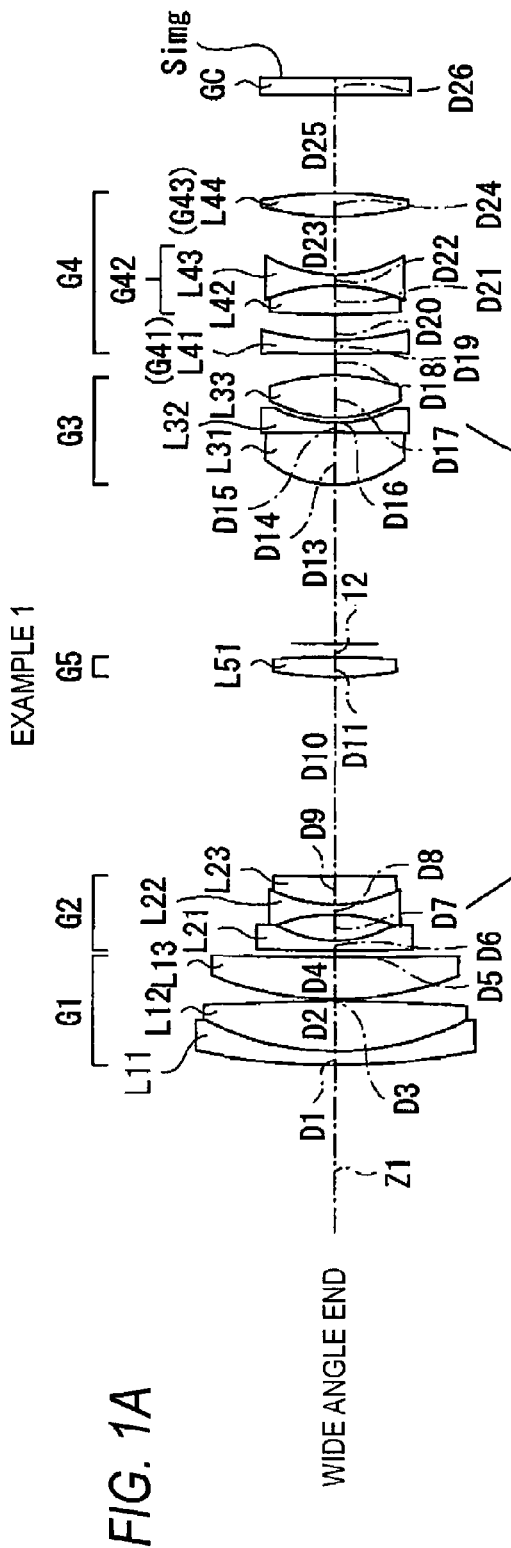
FIG. 1 shows one configuration example of a variable power optical system as a first exemplary embodiment of the invention and is a sectional view corresponding to example 1.
Figure 1B:
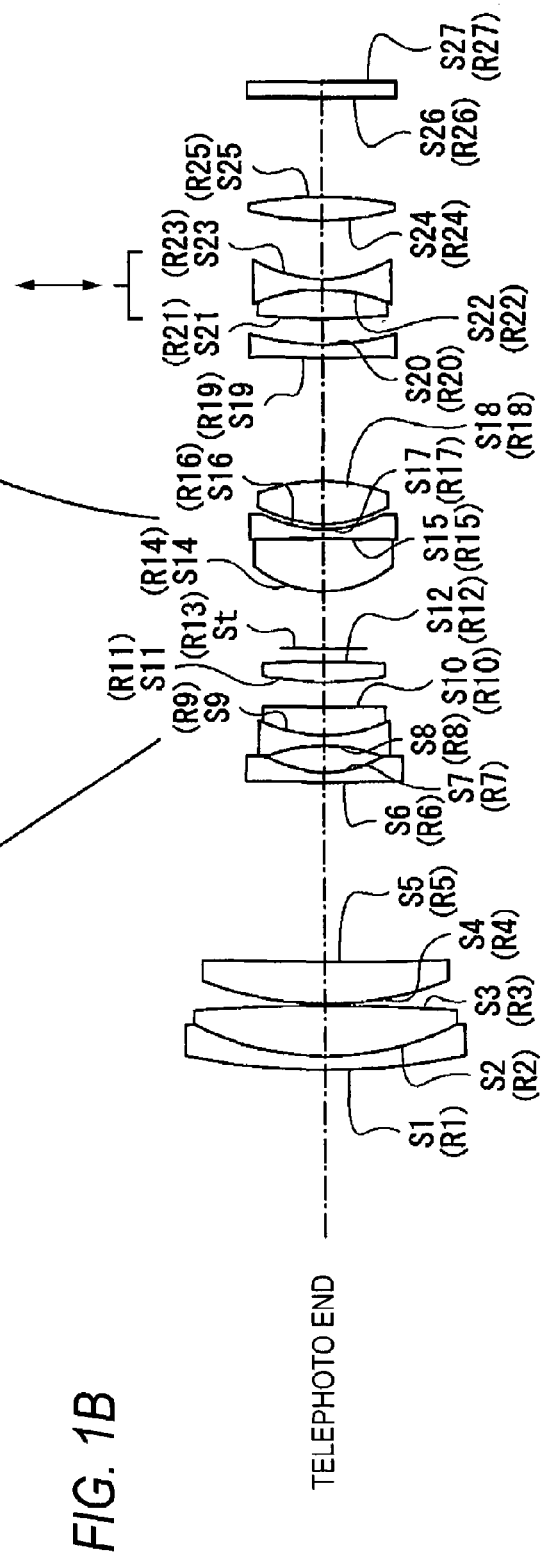

FIG. 1 shows one configuration example of a variable power optical system as a first exemplary embodiment of the invention. This configuration example corresponds to the lens configuration in a first numeric example described later with reference to FIGS. 8 and 9 (example 1). Particularly, FIG. 1(A) shows the lens placement at the infinite distance focusing time at a wide angle end and FIG. 1(B) shows the lens placement at the infinite distance focusing time at a telephoto end. In FIG. 1(B), symbol Si denotes the ith surface (i=1 to 27) when the surface of the component nearest to an object is the first and symbols are given so as to increase in order toward the image side (image formation side). Symbol Ri denotes the curvature radius of the surface Si. In FIG. 1(A), symbol Di denotes spacing on an optical axis Z1 between the ith surface Si and the (i+1)st surface Si+1.

The variable power optical system is installed in a compact camera, a digital still camera, a consumer video camera, etc., for example, for use, and includes a first lens group G1 having positive refractive power, a second lens group G2 having negative refractive power, a third lens group G3 having positive refractive power, a fourth lens group G4 having negative refractive power and containing first to third sub lens groups G41 to G43, and a parallel flat plate GC placed in order from the object side along the optical axis Z1. Further, a fifth lens group G5 having positive refractive power is provided between the second lens group G2 and the third lens group G3. An imaging surface of an imaging device of a CCD (charge-coupled device), etc., (not shown) is placed on an image formation surface Simg. An aperture diaphragm St is placed on the image side of the fifth lens group G5, for example.

The variable power optical system performs the variable power operation by moving the second lens group G2 on the optical axis Z1. For example, to execute variable power from the wide angle side to the telephoto side, the second lens group G2 is moved from the object side to the image side. The move path of the second lens group G2 is almost linear as shown in FIG. 1. When the second lens group G2 is moved, the third lens group G3 is moved together on the optical axis Z1, whereby correction of image surface variation caused by the variable power is made. As the third lens group G3 is moved, focusing is also performed. The third lens group G3 moves so as to draw the curve path represented by the solid line in FIG. 1. On the other hand, the first lens group G1, the fifth lens group G5, and the fourth lens group G4 are fixed groups not moving at variable power and at focusing.

The first lens group G1 includes three lenses of L11 to L13 disposed in order from the object side, for example. The lens L11 is a negative meniscus lens with a convex surface directed to the object side, for example. The lens L12 is a biconvex lens, for example. The lenses L11 and L12 make up a cemented lens, for example. The lens L13 has a positive meniscus shape with a convex surface directed to the object side, for example.

The second lens group G2 includes three lenses of L21 to L23 disposed in order from the object side, for example. The lens L21 is a negative meniscus lens with a convex surface directed to the object side, for example. The lens L22 is a biconcave lens, for example. The lens L23 is a biconvex lens, for example. The lenses L22 and L23 make up a cemented lens.

The fifth lens group G5 is implemented as a single lens L51 having positive refractive power. The lens L51 has a biconvex shape, for example, on paraxial. It is desirable that each of both surfaces S11 and S12 of the lens L51 should have an aspheric shape defined by an expression (ASP) using at least one odd-numbered-order term and one even-numbered-order term as an aspheric coefficient $A_i$, for example.

$$Z=C\times Y^2/\{1+(1-K\times C^2\times Y^2)^{1/2}\}+\Sigma(Ai\times Yi) \qquad (ASP)$$

In the expression (ASP), Z denotes the depth of the aspheric surface, Y denotes the distance from the optical axis Z1 to each lens surface (height), C denotes paraxial curvature=1/R (R: Paraxial curvature radius), K denotes eccentricity, and Ai denotes ith-order (i=integer of 3 or greater) aspheric coefficient. The depth of the aspheric surface, Z, more particularly indicates the length of the normal to the tangential plane of the top of an aspheric surface (plane perpendicular to the optical axis Z1) from a point on the aspheric surface at the position of height Y from the optical axis Z1.

The third lens group G3 includes three lenses of L31 to L33 disposed in order from the object side, for example. The lens L31 is a biconvex lens, for example, and the lens L32 is a biconcave lens, for example. The lenses L31 and L32 make up a cemented lens. Each of both surfaces (surface S17 and surface S18) of the lens L33 is an aspheric surface represented by the expression (ASP), for example, and the lens L33 has a biconvex shape, for example, on paraxial.

The fourth lens group G4 has the first to third sub lens groups G41 to G43 disposed in order from the object side. The first sub lens group G41 is implemented as a single lens L41 having negative refractive power, for example. Each of both surfaces S19 and S20 of the lens L41 is an aspheric surface represented by the expression (ASP), and the lens L41 has a biconcave shape, for example, on paraxial. The second sub lens group G42 is a cemented lens having a biconvex lens L42 and a biconcave lens L43, for example, placed in order from the object side and has negative refractive power as a whole. The whole second sub lens group G42 is moved in the vertical direction relative to the optical axis Z1, thereby correcting image blurring accompanying vibration. The third sub lens group G43 consists of a single lens L44 having a biconvex shape, for example.

It is desirable that the variable power optical system of the embodiment should further satisfy the following conditional expression (1) when correction angle of view Δθ at the telephoto end is 0.5°. In the expression, βtSL is an imaging magnification at the telephoto end in the second sub lens group G42 and βtr is an imaging magnification at the telephoto end in the whole lens (namely, lens L44) positioned to the image side rather than the second sub lens group G42.

$$0.3<|(1-\beta tSL)\times \beta tr|<1.0 \qquad (1)$$

Next, the functions and the advantages of the variable power optical system described above will be discussed.

In the variable power optical system, the first to fourth lens groups G1 to G4 have positive, negative, positive, and negative refractive powers in order, so that the overall length is short and the compact configuration is realized. Specifically, the position of the image side principal point of the whole system is made nearer to the object side. Therefore, the back focus becomes short and the overall length is shortened. Here, the fact that the refractive power of the fourth lens group G4 is negative contributes particularly largely to compaction.

To make image blurring correction, only the second sub lens group G42 of the first to third sub lens groups G41 to G43 making up the fourth lens group G4 is moved in the vertical direction relative to the optical axis Z1. Thus, the occupation ratio of the second sub lens group G42 functioning as an image blurring correction lens group to the whole configuration of the variable power optical system becomes smaller than that in the related arts. Further, the fourth lens group G4 is a fixed group not moving at the variable power time and at the focusing time. Thus, to install the variable power optical system in an imaging apparatus such as a camera, the electric and mechanical loads on the drive mechanism for driving the second sub lens group G42 can be lightened and in addition, the drive mechanism is also simplified. Since the second sub lens group G42 is sandwiched between the first and third sub lens groups G41 and G43 of fixed groups, the sealing performance is enhanced and entering and deposition of dust can be prevented as compared with the case where an image blurring correction lens group is placed in the proximity of a moving group. Particularly, in the variable power optical system, the fourth lens group G4 is a lens group nearest to the image side, so that occurrence of shading can be easily circumvented.

The following two advantages can be produced by providing the positive lens L44 (third sub lens group G43): First, the emission angle of a light beam toward the image formation surface Simg lessens (approaches so as to be parallel with the optical axis Z1), so that the light reception efficiency of the imaging device placed on the image formation surface Simg can be improved. Second, the sensitivity of image blurring correction enhances and effective image blurring correction can be made according to a small move distance of the second sub lens group G42.

The lens L41 (first sub lens group G41) with both surfaces S19 and S20 being aspheric is placed just before the second sub lens group G42 of an image blurring correction lens group, whereby field curvature and distortion can be better corrected. The lens L33 with both surfaces S17 and S18 being aspheric is placed just before the lens L41 and the aberrations and distortion can be corrected efficiently through both the lenses. As the lenses L33 and L41 are placed so as to be adjacent to each other, the optical action as aspheric lenses can be shared between the lenses in good balance. Thus, the effects of eccentricity and axis shift on the resolution occurring at the molding time and at the assembling time can be eased and the tolerance of a manufacturing error widens. p Since the second sub lens group G42 is a cemented lens including the positive lens L42 and the negative lens L43, spherical aberration and chromatic aberration are particularly well corrected.

Conditional expression (1) defines maximum move distance S in the direction orthogonal to the optical axis Z1 at the telephoto end in the second sub lens group G42. The relation between the maximum move distance S and displacement amount ΔY of the image on the image formation surface Simg corresponding to the maximum move distance S can be represented as in the following expression (2):

$$|(1-\beta tSL)\times \beta tr|\times S=\Delta Y \qquad (2)$$

where the displacement amount ΔY can be represented as $$\Delta Y = ft \times \tan \Delta\theta \quad (3)$$

using focal length ft of the whole system at the telephoto end and the correction angle of view Δθ at the telephoto end. Therefore, from expressions (2) and (3), $$|(1-\beta tSL) \times \beta tr| = ft \times \tan \Delta\theta / S$$

and $$S = ft \times \tan \Delta\theta / |(1-\beta tSL) \times \beta tr| \quad (4)$$

Generally, it is required that the correction angle of view Δθ be 0.5° or more. At this time, conditional expression (1) is satisfied, whereby the maximum move distance S is optimized and good image blurring correction operation can be executed. If the value falls below the lower limit in conditional expression (1), the sensitivity of the image blurring correction lowers and responsibility degrades and in addition, the maximum move distance S grows to make a sufficient image blurring correction. Consequently, the weight and the dimensions grow and it becomes difficult to accomplish miniaturization and in addition, the load on the drive mechanism also increases. On the other hand, if the upper limit is exceeded in conditional expression (1), the sensitivity of the image blurring correction becomes excessive and move distance adjustment of the second sub lens group G42 becomes intricate.

The fifth lens group G5 is provided, whereby a larger variable power ratio can be ensured.

Thus, in the variable power optical system of the embodiment, while the sufficiently good image blurring correction function is exerted, the simple and compact configuration as a whole is implemented.

Second Embodiment

Next, a variable power optical system as a second embodiment of the invention will be discussed. FIG. 2 shows one configuration example of the variable power optical system as a second exemplary embodiment. This configuration example corresponds to the lens configuration in a second numeric example described later with reference to FIGS. 10 and 11 (example 2). The variable power optical system of the embodiment adopts a bend optical system, but has a basic configuration similar to that of the variable power optical system in the first embodiment previously described with reference to FIG. 1. Therefore, only the differences therebetween will be mainly discussed and duplicate description will be skipped as required.

In the embodiment, a first lens group G1 has, for example, a lens L11 having a negative meniscus shape with a convex surface directed to the object side, a right-angle prism L12 having a reflection surface RS, a planoconvex lens L13 with a convex surface directed to the image side, and a biconvex lens L14 in order from the object side. Thus, the optical path of an incident light beam is bent by the reflection surface RS to form a bend optical system and the space is used efficiently. Consequently, a compact configuration suited to installation in an imaging apparatus such as a slimmed camera, for example, can be implemented while the sufficiently good image blurring correction function is exerted. It is desirable that each of both surfaces S7 and S8 of the lens L14 should be an aspheric surface defined in the expression (ASP) from the viewpoint of making a good aberration correction. A lens L41 has a meniscus shape with a convex surface directed to the object side, for example, on paraxial.

Third Embodiment

Next, a variable power optical system as a third embodiment of the invention will be discussed. FIG. 3 shows one configuration example of the variable power optical system as a third exemplary embodiment. This configuration example corresponds to the lens configuration in a third numeric example described later with reference to FIGS. 12 and 13 (example 3). The variable power optical system of the embodiment has an almost similar configuration to that of the variable power optical system of the first embodiment previously described with reference to FIG. 1 except that a fourth lens group G4 includes two sub lens groups. Therefore, only the differences therebetween will be mainly discussed and duplicate description will be skipped as required.

In the variable power optical system of the embodiment, the fourth lens group G4 has only first and second sub lens groups G41 and G42 placed in order from the object side. The first sub lens group G41 is implemented as a single lens L41 having positive refractive power, for example. The lens L41 has a meniscus shape with a convex surface directed to the image side on paraxial. The second sub lens group G42 is a cemented lens including a lens L42 having a positive meniscus shape with a convex surface directed to the image side and a biconcave lens L43 placed in order from the object side, for example, and has negative refractive power as a whole.

According to the configuration, the overall length is further shortened and still more compaction can be accomplished as compared with the variable power optical system as the first embodiment.

Fourth Embodiment

Figures 4A, 4B:
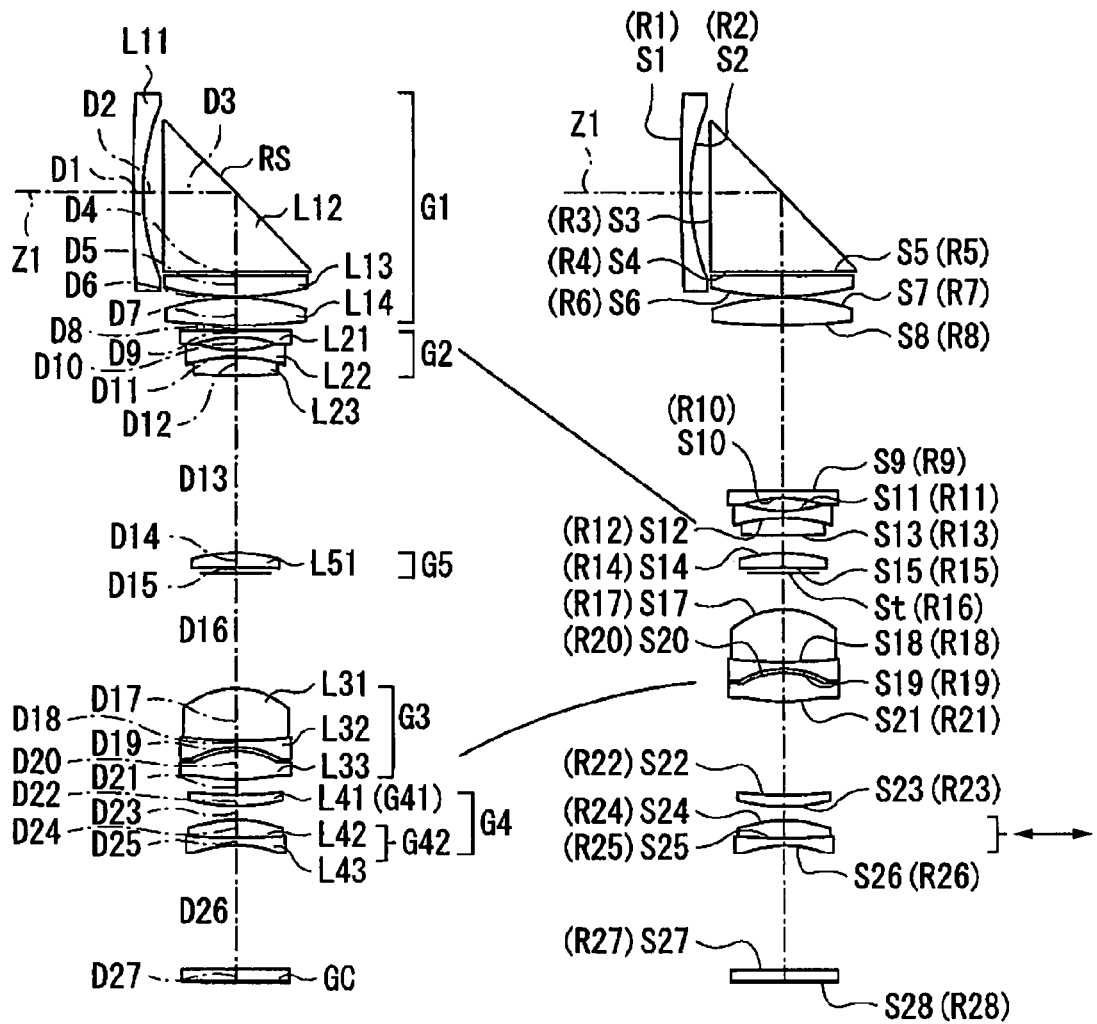
FIG. 4 shows one configuration example of the variable power optical system as a fourth exemplary embodiment of the invention and is a sectional view corresponding to example 4.

Next, a variable power optical system as a fourth embodiment of the invention will be discussed. FIG. 4 shows one configuration example of the variable power optical system as a fourth exemplary embodiment. This configuration example corresponds to the lens configuration in a fourth numeric example described later with reference to FIGS. 14 and 15 (example 4). The variable power optical system of the embodiment has an almost similar configuration to that of the variable power optical system of the second embodiment previously described with reference to FIG. 2 except that a fourth lens group G4 includes two sub lens groups. Therefore, only the differences therebetween will be mainly discussed and duplicate description will be skipped as required.

In the variable power optical system of the embodiment, the fourth lens group G4 has only first and second sub lens groups G41 and G42 placed in order from the object side like that in the third embodiment. Therefore, the overall length is further shortened and still more compaction can be accomplished as compared with the variable power optical system as the second embodiment.

Fifth Embodiment

Figures 5A, 5B:
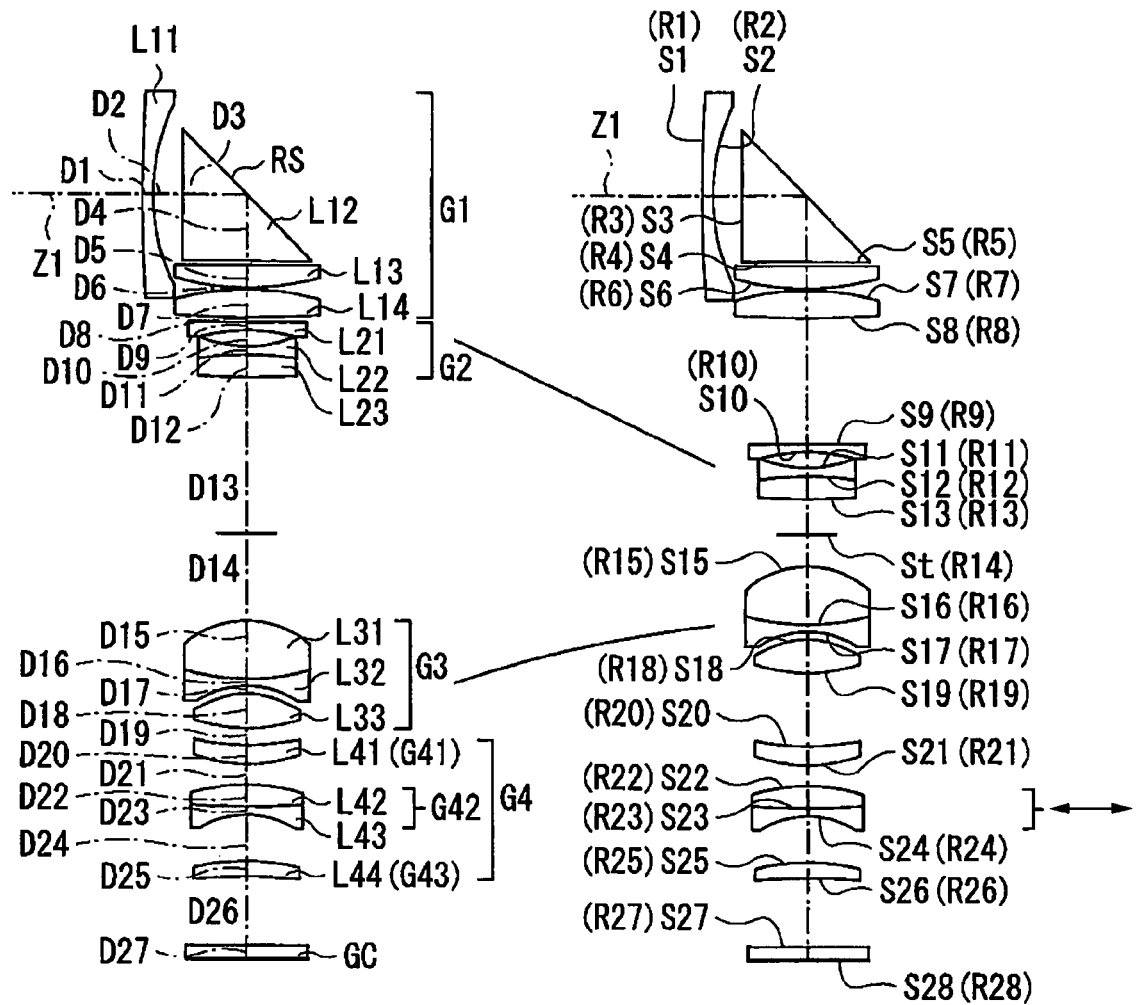
FIG. 5 shows one configuration example of the variable power optical system as a fifth exemplary embodiment of the invention and is a sectional view corresponding to example 5.
Figures 30A, 30B, 30C, 30D:
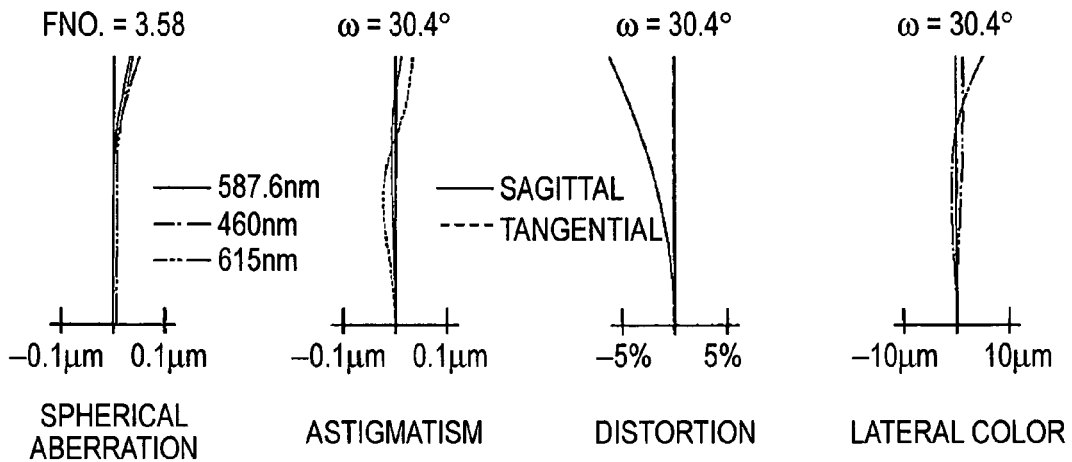
FIG. 30 is an aberration drawing to show spherical aberration, astigmatism, distortion, and lateral color at the wide angle end in the variable power optical system of example 1.
Figures 31A, 31B, 31C, 31D:
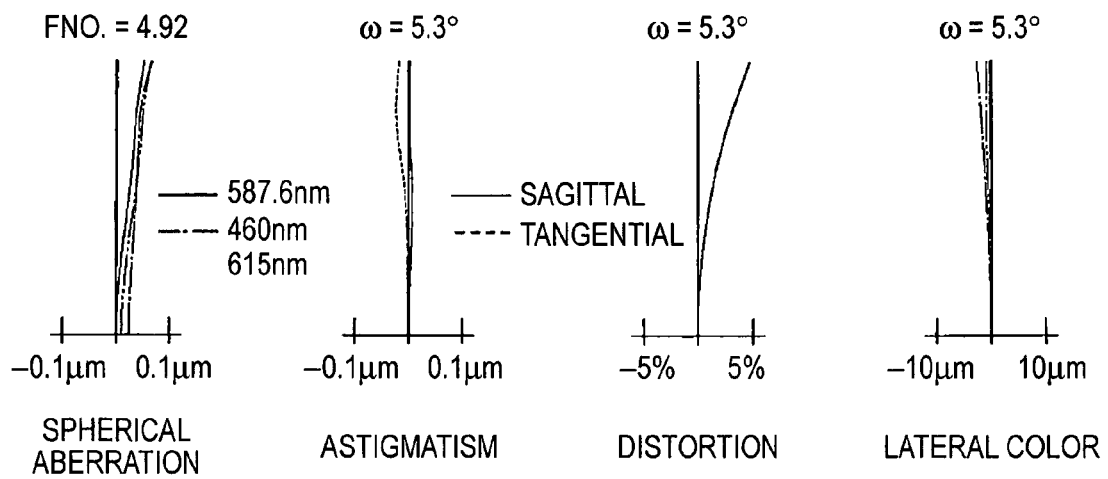
FIG. 31 is an aberration drawing to show spherical aberration, astigmatism, distortion, and lateral color at the telephoto end in the variable power optical system of example 1.
Figures 32A, 32B, 32C, 32D:
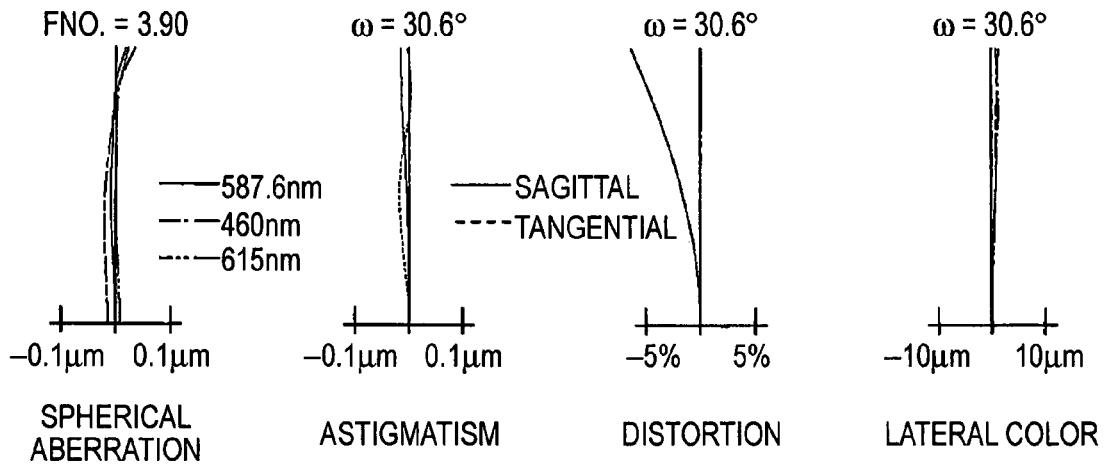
FIG. 32 is an aberration drawing to show spherical aberration, astigmatism, distortion, and lateral color at the wide angle end in the variable power optical system of example 2.
Figures 33A, 33B, 33C, 33D:
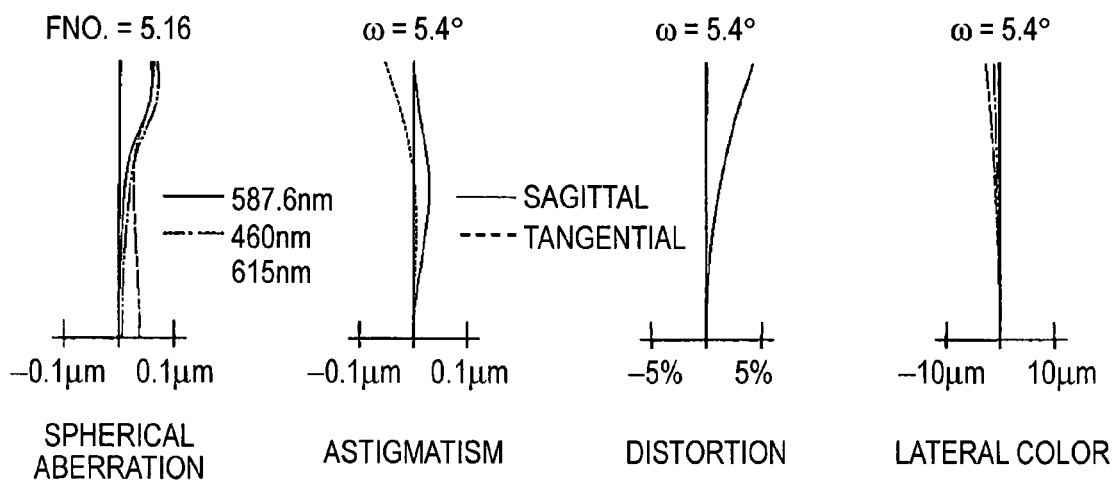
FIG. 33 is an aberration drawing to show spherical aberration, astigmatism, distortion, and lateral color at the telephoto end in the variable power optical system of example 2.
Figure 34A:
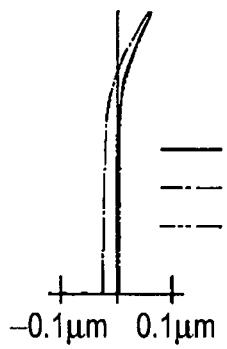
FIG. 34 is an aberration drawing to show spherical aberration, astigmatism, distortion, and lateral color at the wide angle end in the variable power optical system of example 3.
Figure 34B:
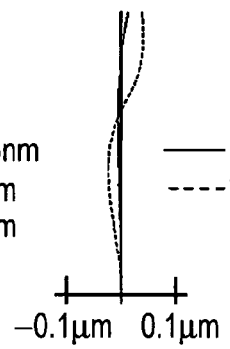
Figure 34C:
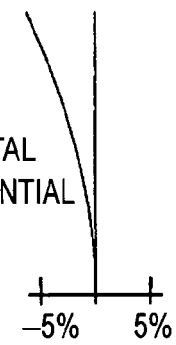
Figure 34D:
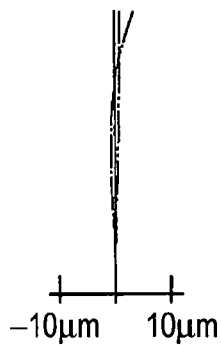
Figure 35A:
FIG. 35 is an aberration drawing to show spherical aberration, astigmatism, distortion, and lateral color at the telephoto end in the variable power optical system of example 3.
Figure 35B:
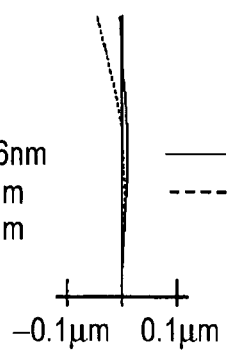
Figure 35C:
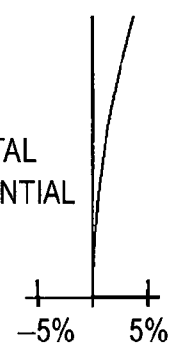
Figure 35D:
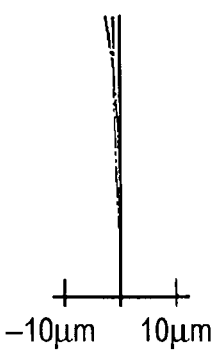
Figures 40A, 40B, 40C, 40D:
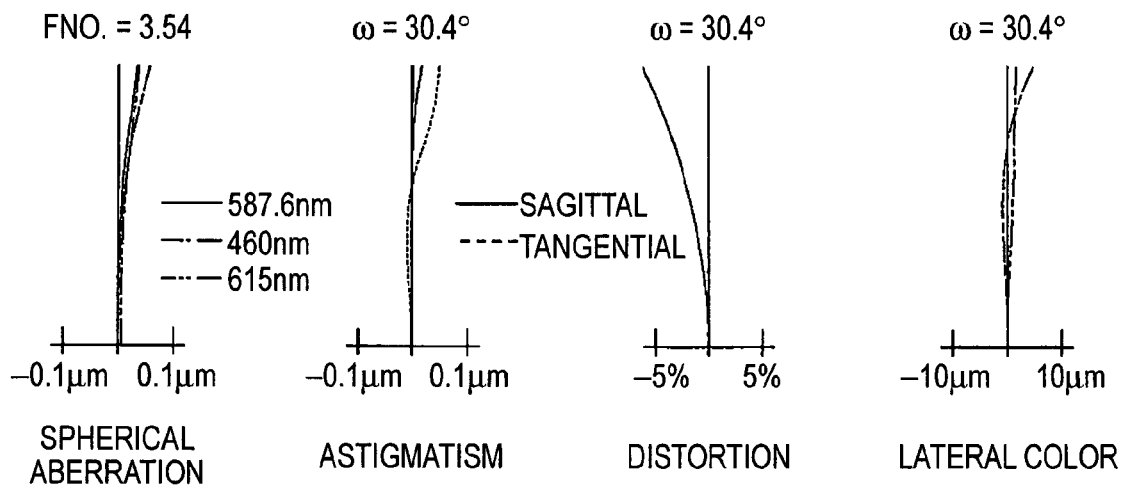
FIG. 40 is an aberration drawing to show spherical aberration, astigmatism, distortion, and lateral color at the wide angle end in the variable power optical system of example 6.
Figures 41A, 41B, 41C, 41D:
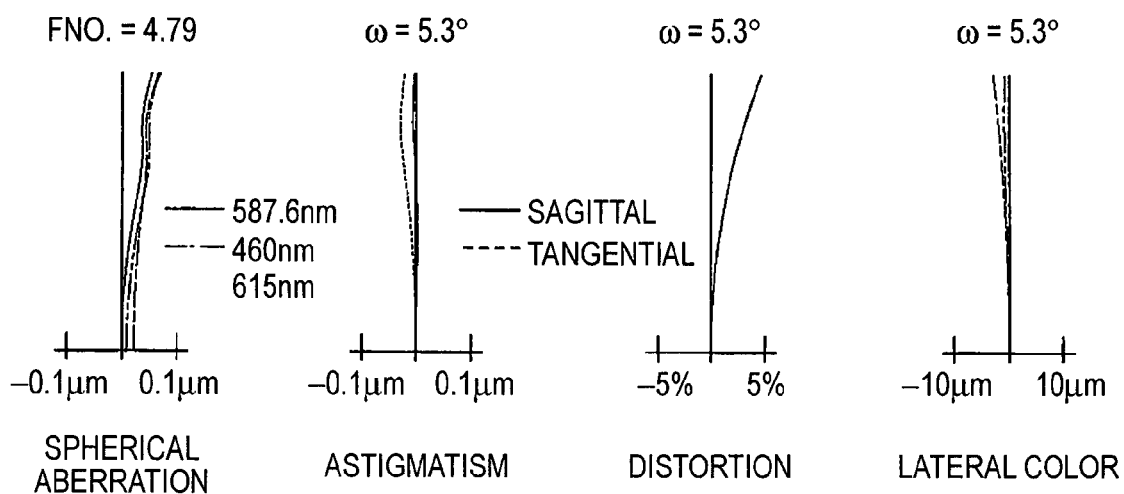
FIG. 41 is an aberration drawing to show spherical aberration, astigmatism, distortion, and lateral color at the telephoto end in the variable power optical system of example 6.
Figures 42A, 42B, 42C, 42D:
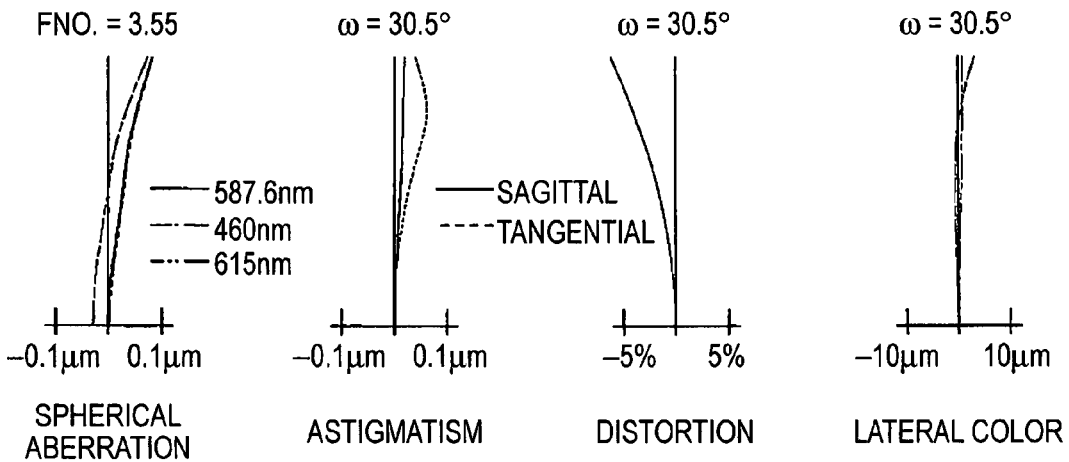
FIG. 42 is an aberration drawing to show spherical aberration, astigmatism, distortion, and lateral color at the wide angle end in the variable power optical system of example 7.
Figures 43A, 43B, 43C, 43D:
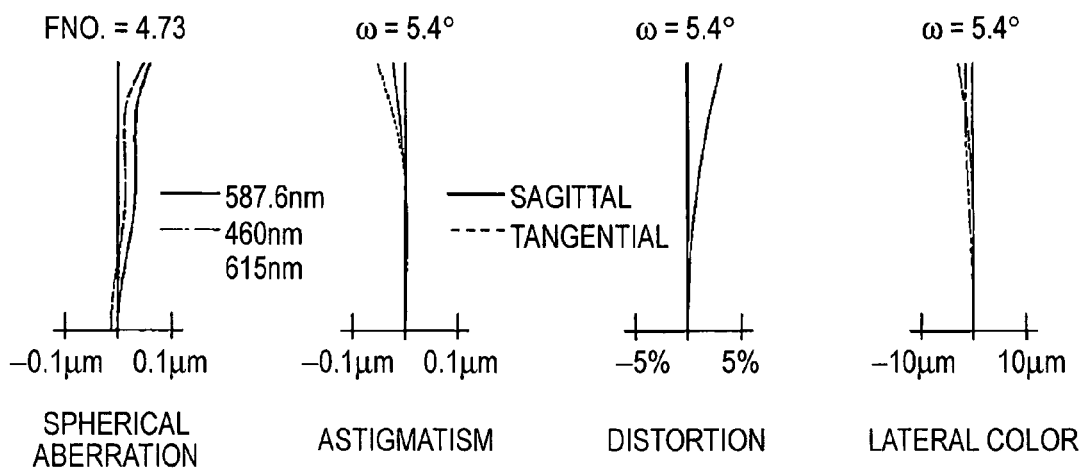
FIG. 43 is an aberration drawing to show spherical aberration, astigmatism, distortion, and lateral color at the telephoto end in the variable power optical system of example 7.
Figure 45A:
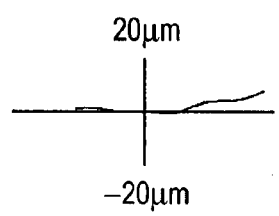
FIG. 45 is a lateral aberration drawing to show performance change at the image blurring correction time at the telephoto end in the variable power optical system of example 2 as compared with that in the usual state.
Figure 45D:
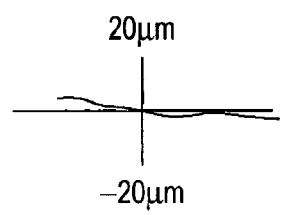
Figure 45B:
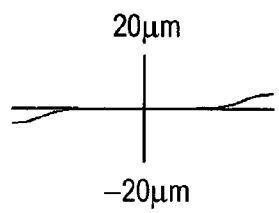
Figure 45E:
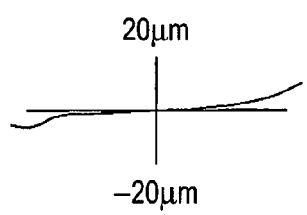
Figure 45C:
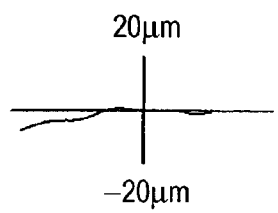
Figure 45F:
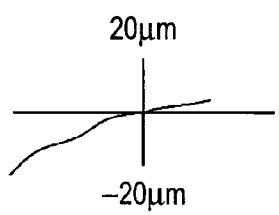
Figure 46A:
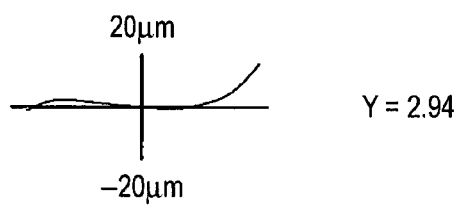
FIG. 46 is a lateral aberration drawing to show performance change at the image blurring correction time at the telephoto end in the variable power optical system of example 3 as compared with that in the usual state.
Figure 46D:
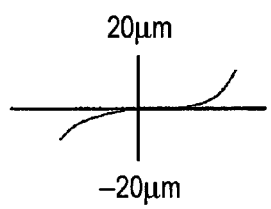
Figure 46B:
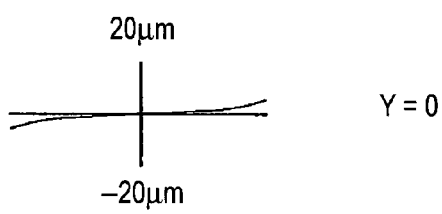
Figure 46E:
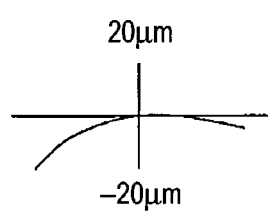
Figure 46C:
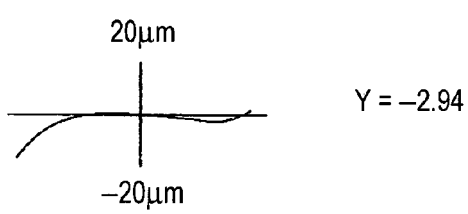
Figure 46F:
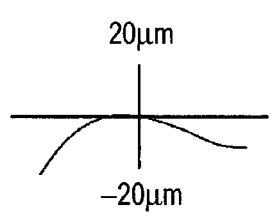
Figure 47A:
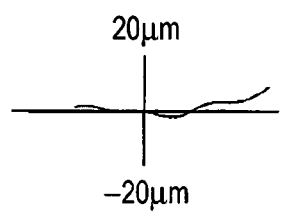
FIG. 47 is a lateral aberration drawing to show performance change at the image blurring correction time at the telephoto end in the variable power optical system of example 4 as compared with that in the usual state.
Figure 47D:
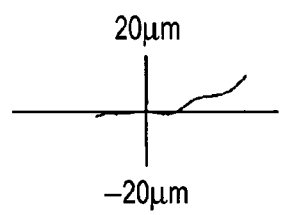
Figure 47B:
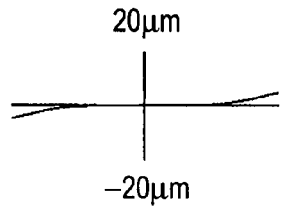
Figure 47E:
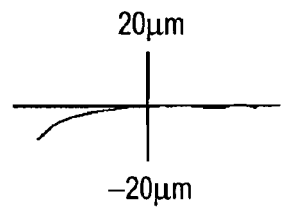
Figure 47C:
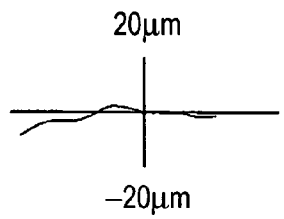
Figure 47F:
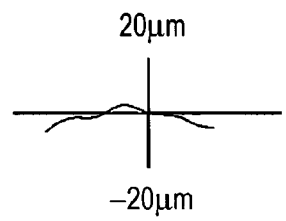
Figure 48A:
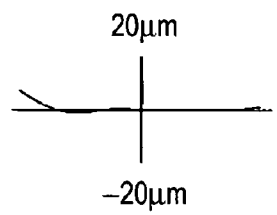
FIG. 48 is a lateral aberration drawing to show performance change at the image blurring correction time at the telephoto end in the variable power optical system of example 5 as compared with that in the usual state.
Figure 48D:
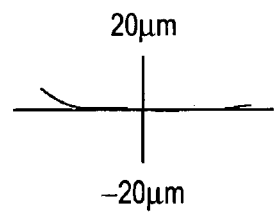
Figure 48B:
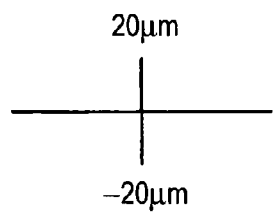
Figure 48E:
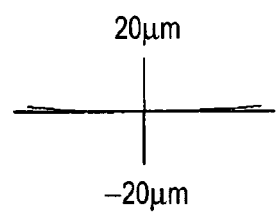
Figure 48C:
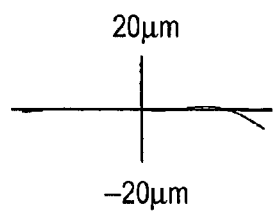
Figure 48F:
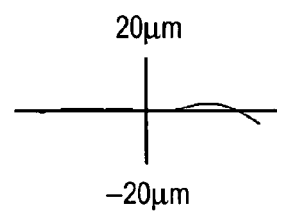
Figure 49A:
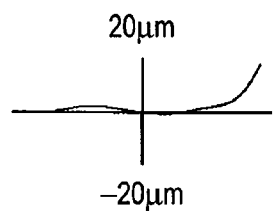
FIG. 49 is a lateral aberration drawing to show performance change at the image blurring correction time at the telephoto end in the variable power optical system of example 6 as compared with that in the usual state.
Figure 49D:
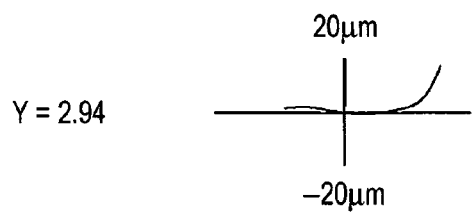
Figure 49B:
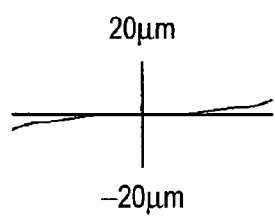
Figure 49E:
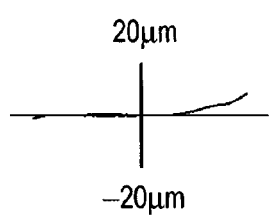
Figure 49C:
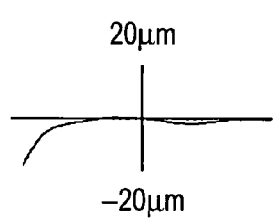
Figure 49F:
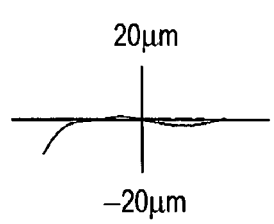
Figure 50A:
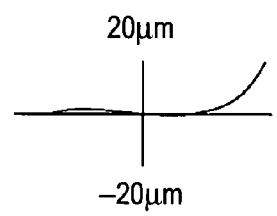
FIG. 50 is a lateral aberration drawing to show performance change at the image blurring correction time at the telephoto end in the variable power optical system of example 7 as compared with that in the usual state.
Figure 50D:
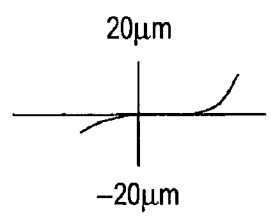
Figure 50B:
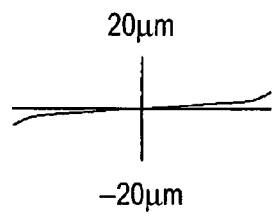
Figure 50E:
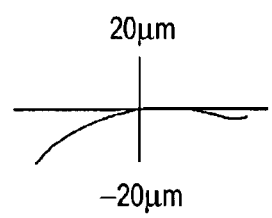
Figure 50C:
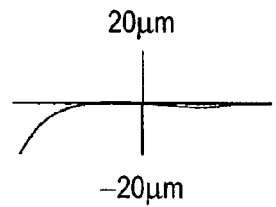
Figure 50F:
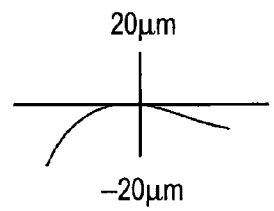

Next, a variable power optical system as a fifth embodiment of the invention will be discussed. FIG. 5 shows one configuration example of the variable power optical system as a fifth exemplary embodiment. This configuration example corresponds to the lens configuration in a fifth numeric example described later with reference to FIGS. 16 and 17 (example 5). The variable power optical system of the embodiment has an almost similar configuration to that of the variable power optical system of the second embodiment previously described with reference to FIG. 2 except that no fifth lens group G5 is placed. Therefore, only the differences therebetween will be mainly discussed and duplicate description will be skipped as required.

The variable power optical system of the embodiment contains no fifth lens group G5 and includes only first to fourth lens groups G1 to G4 placed in order from the object side. Thus, the whole configuration is simplified and the variable power optical system is advantageous for slimming down and miniaturization.

Sixth Embodiment

Next, a variable power optical system as a sixth embodiment of the invention will be discussed. FIG. 6 shows one configuration example of the variable power optical system as a sixth exemplary embodiment. This configuration example corresponds to the lens configuration in a sixth numeric example described later with reference to FIGS. 18 and 19 (example 6). In the first to fifth embodiments, the first lens group G1 nearest to the object side is a fixed group; in the sixth embodiment, however, a first lens group G1 as well as a second lens group G2 is moved along an optical axis Z1, thereby performing variable power. For example, to execute variable power from the wide angle side to the telephoto side, the first lens group G1 is moved a little so that it once moves from the object side to the image side and then is gradually moved to the object side and again is moved a little so that it moves from the object side to the image side. The move path of the first lens group G1 draws a curve shaped like a letter S as shown in FIG. 6.

In the embodiment, on the telephoto side, the first lens group G1 is moved to the object side, so that the spacing between the first lens group G1 and the second lens group G2 can be widened sufficiently. Thus, while the overall length is maintained short, a larger variable power ratio can be provided. On the other hand, on the wide angle side, the first lens group G1 is moved to the image side and is approached to an aperture diaphragm St, so that the diameter of each of lenses making up the first lens group G1 can be reduced.

Seventh Embodiment

Next, a variable power optical system as a seventh embodiment of the invention will be discussed. FIG. 7 shows one configuration example of the variable power optical system as a seventh exemplary embodiment. This configuration example corresponds to the lens configuration in a seventh numeric example described later with reference to FIGS. 20 and 21 (example 7). The variable power optical system of the embodiment has an almost similar configuration to that of the variable power optical system of the sixth embodiment previously described with reference to FIG. 6 except that a fourth lens group G4 includes two sub lens groups. In the variable power optical system of the embodiment, the fourth lens group G4 has only first and second sub lens groups G41 and G42 placed in order from the object side. The first sub lens group G41 is implemented as a single lens L41 having positive refractive power, for example. The lens L41 has a meniscus shape with a convex surface directed to the image side on paraxial. The second sub lens group G42 is a cemented lens including a lens L42 having a positive meniscus shape with a convex surface directed to the image side and a biconcave lens L43 placed in order from the object side, for example, and has negative refractive power as a whole. According to the configuration, the overall length is shortened and still more compaction can be accomplished as compared with the variable power optical system as the sixth embodiment.

EXAMPLES

Next, specific numeric examples of the variable power optical systems according to the embodiments will be discussed. First to seventh numeric examples (examples 1 to 7) will be discussed together.

FIGS. 8 and 9 show specific lens data (example 1) corresponding to the variable power optical system shown in FIG. 1. Likewise, FIGS. 10 to 21 show specific lens data (examples 2 to 7) corresponding to the variable power optical systems shown in FIGS. 2 to 7. FIGS. 8, 10, 12, 14, 16, 18, and 20 show the basic data (basic lens data) of the lens data of the examples, and FIGS. 9, 11, 13, 15, 17, 19, and 21 show the data concerning aspheric shapes (aspheric data), of the lens data of the examples.

The column of surface number Si in the basic lens data shown in each of FIGS. 8, 10, 12, 14, 16, 18, and 20 indicates the number of the ith (i=1 to 30) surface with the symbol given so as to increase in order toward the exit pupil side wherein the surface of the component nearest to the object side is the first corresponding to the symbol Si shown in FIGS. 1 to 7 about the variable power optical systems of the examples. The column of curvature radius Ri indicates the value of the curvature radius of the ith surface from the object side corresponding to the symbol Ri shown in FIGS. 1 to 7. The column of spacing Di also indicates the spacing on the optical axis between the ith surface Si and the "i+1"st surface Si+1 from the object side corresponding to the symbol given in FIGS. 1 to 7. The values of the curvature radius Ri and the spacing Di are in millimeter (mm) units. The columns of Ndj and vdj indicate the values of the refractive index and the Abbe number of the jth (j=1 to 16) lens element from the object side at the d-line (587.6 nm). Symbol "*" given to the left of the surface number Si indicates that the lens surface is an aspheric shape. Specifically, in examples 1, 3, 6, and 7, surfaces S11 and S12 of a lens L51, surfaces S17 and S18 of a lens L33, and surfaces S19 and S20 of a lens L41 are aspheric. In examples 2 and 4, surfaces S7 and S8 of a lens L14, surfaces S14 and S15 of a lens L51, surfaces S20 and S21 of a lens L33, and surfaces S22 and S23 of a lens L41 are aspheric. In example 5, surfaces S7 and S8 of a lens L14, surfaces S18 and S19 of a lens L33, and surfaces S20 and S21 of a lens L41 are aspheric. In the basic lens data, the numeric value of the curvature radius in the proximity of the optical axis (paraxial) is shown as the curvature radius of each of the aspheric surfaces.

In the aspheric data, the values of coefficients Ai and K in the expressions of aspheric shapes represented by the following expression (ASP) are shown. As shown in the aspheric data, the aspheric shapes in the variable power optical systems of examples 1 to 7 are formed using not only even-numbered-order terms, but also odd-numbered-order terms effectively as the aspheric coefficient Ai.

In examples 1, 3, 6, and 7, the second lens group G2 and the fourth lens group G4 (in examples 6 and 7, further the first lens group G1) move on the optical axis accompanying variable power and thus the values of the spacings D5, D10, D13, and D18 are variable. Likewise, in examples 2 and 4, the values of the spacings D8, D13, D16, and D21 are variable. In example 5, the values of the spacings D8, D13, D14, and D19 are variable.

FIG. 22 shows the values of the variable spacings D5, D10, D13, and D18 at the wide angle end and the telephoto end in example 1 as miscellaneous lens data. Likewise, FIG. 23 shows the values of the variable spacings D8, D13, D16, and D21 at the wide angle end and the telephoto end in example 2; FIG. 24 shows the values of the variable spacings D5, D10, D13, and D18 at the wide angle end and the telephoto end in example 3; FIG. 25 shows the values of the variable spacings D8, D13, D16, and D21 at the wide angle end and the telephoto end in example 4; FIG. 26 shows the values of the variable spacings D8, D13, D14, and D19 at the wide angle end and the telephoto end in example 5; FIG. 27 shows the values of the variable spacings D5, D10, D13, and D18 at the wide angle end and the telephoto end in example 6; and FIG. 28 shows the values of the variable spacings D5, D10, D13, and D18 at the wide angle end and the telephoto end in example 7. FIGS. 22 to 28 also show the values of focal length f (mm) of the whole system at the wide angle end and the telephoto end.

FIG. 29 shows the values concerning conditional expression (1) collectively for the examples. As shown in FIG. 29, the values in the examples are all within the numeric ranges in conditional expression (1).

Further, FIGS. 30(A) to 30(D) show spherical aberration, astigmatism, distortion, and lateral color at the wide angle end in the variable power optical system of example 1. FIGS. 31(A) to 31(D) show spherical aberration, astigmatism, distortion, and lateral color at the telephoto end in the variable power optical system of example 1. Each aberration drawing shows aberration in a usual state in which the second sub lens group G42 for making image blurring correction is at the usual position and the effect of vibration caused by hand movement, etc., is not received. In the astigmatism drawing, the solid line indicates aberration in a sagittal direction and the dashed line indicates aberration in a tangential direction.

Likewise, FIGS. 32(A) to 32(D) show aberrations and distortion at the wide angle end in example 2 and FIGS. 33(A) to 33(D) show aberrations and distortion at the telephoto end in example 2. FIGS. 34(A) to 34(D) show aberrations and distortion at the wide angle end in example 3 and FIGS. 35(A) to 35(D) show aberrations and distortion at the telephoto end in example 3. FIGS. 36(A) to 36(D) show aberrations and distortion at the wide angle end in example 4 and FIGS. 37(A) to 37(D) show aberrations and distortion at the telephoto end in example 4. FIGS. 38(A) to 38(D) show aberrations and distortion at the wide angle end in example 5 and FIGS. 39(A) to 39(D) show aberrations and distortion at the telephoto end in example 5. FIGS. 40(A) to 40(D) show aberrations and distortion at the wide angle end in example 6 and FIGS. 41(A) to 41(D) show aberrations and distortion at the telephoto end in example 6. FIGS. 42(A) to 42(D) show aberrations and distortion at the wide angle end in example 7 and FIGS. 43(A) to 43(D) show aberrations and distortion at the telephoto end in example 7.

As seen from the aberration drawings, good aberration correction is made from the wide angle end to the telephoto end in the usual state in the examples.

Further, FIGS. 44(A) to (F) show aberration variation at the hand movement correction time about example 1 as compared with that in the usual state. FIGS. 44(A) to (C) show lateral aberration in the usual state at the telephoto end and FIGS. 44(D) to (F) show lateral aberration at the image blurring correction time (correction angle of view 0.5°) at the telephoto end. Each aberration drawing shows the aberration with the d line as the reference wavelength. FNO. indicates F value, ω indicates half angle of view, and Y indicates the distance (image height) from the optical axis to the image point (mm). p Likewise, FIGS. 45(A) to (F) show lateral aberration about example 2; FIGS. 46(A) to (F) show lateral aberration about example 3; FIGS. 47(A) to (F) show lateral aberration about example 4; FIGS. 48(A) to (F) show lateral aberration about example 5; FIGS. 49(A) to (F) show lateral aberration about example 6; and FIGS. 50(A) to (F) show lateral aberration about example 7.

As seen in FIGS. 44(A) to (C), FIGS. 45(A) to (F), FIGS. 46(A) to (F), FIGS. 47(A) to (F), FIGS. 48(A) to (F), FIGS. 49(A) to (F), and FIGS. 50(A) to (F), the aberration variation at the image blurring correction time about each example is reduced to a minimum. p According to the numeric data and the aberration drawings, it can be confirmed that the high-performance variable power optical system that can well maintain the optical performance at the image blurring correction time while it has a compact whole configuration is realized in each example.

Although the invention has been described in the embodiments and the examples, it is to be understood that the invention is not limited to the specific embodiments or examples thereof and various modifications may be made. For example, the values of the curvature radius, the spacing, and the refractive index of each lens component are not limited to the values shown in the numeric examples and can take any other value.

This application claims foreign priority from Japanese Patent Application No. 2006-105111, filed Apr. 6, 2006, the entire disclosure of which is herein incorporated by reference.

What is claimed is:

1. A variable power optical system comprising: in order from an object side of the variable power optical system,
a first lens group having a positive refractive power;
a second lens group having a negative refractive power;
a third lens group having a positive refractive power; and
a fourth lens group having a negative refractive power and comprising a plurality of sub lens groups,
wherein
the second lens group is moved along an optical axis thereof to vary a power of the variable power optical system, and the third lens group is moved along the optical axis thereof to correct image surface variation caused by the varying of the power and to perform focusing of the variable power optical system, and
the fourth lens group is fixed at the time of the varying of the power and the focusing, and one of the plurality of sub lens groups is a cemented lens including a positive lens and a negative lens placed in order from the object side, and the cemented lens moves in a direction perpendicular to the optical axis to move an image.

2. The variable power optical system as claimed in claim 1, wherein the fourth lens group comprises first to third sub lens groups placed in order from the object side, and the second sub lens group moves in the direction perpendicular to the optical axis to move the image.

3. The variable power optical system as claimed in claim 2, wherein the third sub lens group consists of a single lens having a positive refractive power.

4. The variable power optical system as claimed in claim 2, wherein the first sub lens group comprises a single lens having at least one aspheric surface.

5. The variable power optical system as claimed in claim 2, wherein the second sub lens group comprises a cemented lens, the cemented lens comprising a positive lens and a negative lens placed in order from the object side.

6. The variable power optical system as claimed in claim 2, satisfying Conditional Expression (1):

$$0.3 < |(1 - \beta tSL) \times \beta tr| < 1.0 \qquad (1)$$

wherein $\beta tSL$ is an imaging magnification at the telephoto end in the second sub lens group, and $\beta tr$ is an imaging magnification at the telephoto end in lenses positioned to the image side rather than the second sub lens group, provided that βtr is 1 when there is no lens positioned to the image side rather than the second sub lens group.

7. The variable power optical system as claimed in claim 2, wherein the first lens group comprises: a single lens having a negative refractive power and having a concave surface directed to an image side thereof an optical path-diverting member that bends an optical path; and at least one single lens having a positive refractive power, in order from the object side.

8. The variable power optical system as claimed in claim 2, further comprising a fifth lens group between the second lens group and the third lens group, the fifth lens group having a positive refractive power and being fixed at the time of the varying of the power and the focusing.

9. The variable power optical system as claimed in claim 2, wherein the first lens group is fixed at the time of the varying of the power and the focusing.

10. The variable power optical system as claimed in claim 1 wherein the fourth lens group comprises first and second sub lens groups placed in order from the object side, and the second sub lens group moves in the direction perpendicular to the optical axis to move the image.

11. The variable power optical system as claimed in claim 10, wherein the first sub lens group comprises a single lens having at least one aspheric surface.

12. The variable power optical system as claimed in claim 10, wherein the second sub lens group comprises a cemented lens, the cemented lens comprising a positive lens and a negative lens placed in order from the object side.

13. The variable power optical system as claimed in claim 10, satisfying Conditional Expression (1):

$$0.3 < |(1-\beta tSL) \times \beta tr| < 1.0 \qquad (1)$$

wherein βtSL is an imaging magnification at the telephoto end in the second sub lens group, and βtr is an imaging magnification at the telephoto end in lenses positioned to the image side rather than the second sub lens group, provided that βtr is 1 when there is no lens positioned to the image side rather than the second sub lens group.

14. The variable power optical system as claimed in claim 10, wherein the first lens group comprises: a single lens having a negative refractive power and having a concave surface directed to an image side thereof an optical path-diverting member that bends an optical path; and at least one single lens having a positive refractive power, in order from the object side.

15. The variable power optical system as claimed in claim 10, further comprising a fifth lens group between the second lens group and the third lens group, the fifth lens group having a positive refractive power and being fixed at the time of the varying of the power and the focusing.

16. The variable power optical system as claimed in claim 10, wherein the first lens group is fixed at the time of the varying of the power and the focusing.

17. The variable power optical system as claimed in claim 1, wherein the first lens group comprises: a single lens having a negative refractive power and having a concave surface directed to an image side thereof, an optical path-diverting member that bends an optical path; and at least one single lens having a positive refractive power, in order from the object side.

18. The variable power optical system as claimed in claim 17, further comprising a fifth lens group between the second lens group and the third lens group, the fifth lens group having a positive refractive power and being fixed at the time of the varying of the power and the focusing.

19. The variable power optical system as claimed in claim 17, wherein the first lens group is fixed at the time of the varying of the power and the focusing.

20. The variable power optical system as claimed in claim 1, further comprising a fifth lens group between the second lens group and the third lens group, the fifth lens group having a positive refractive power and being fixed at the time of the varying of the power and the focusing.

21. The variable power optical system as claimed in claim 1, wherein the first lens group is fixed at the time of the varying of the power and the focusing.

22. The variable power optical system as claimed in claim 1, wherein the first lens group moves on the optical axis at the time of the varying of the power.

23. The variable power optical system as claimed in claim 2, wherein the first lens group moves on the optical axis at the time of the varying of the power.

24. The variable power optical system as claimed in claim 10, wherein the first lens group moves on the optical axis at the time of the varying of the power.

25. The variable power optical system as claimed in claim 17, wherein the first lens group moves on the optical axis at the time of the varying of the power.

* * * * *